(12) United States Patent
Davis et al.

(10) Patent No.: US 9,720,073 B1
(45) Date of Patent: *Aug. 1, 2017

(54) VEHICULAR RADAR SENSING SYSTEM UTILIZING HIGH RATE TRUE RANDOM NUMBER GENERATOR

(71) Applicant: UHNDER, INC., Austin, TX (US)

(72) Inventors: Curtis Davis, St. Louis, MO (US); Manju Hegde, St. Louis, MO (US); Wayne E. Stark, Ann Arbor, MI (US); John Lovberg, San Diego, CA (US)

(73) Assignee: UHNDER, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,447

(22) Filed: Feb. 9, 2017

Related U.S. Application Data

(63) Continuation of application No. 15/204,003, filed on Jul. 7, 2016, now Pat. No. 9,575,160.
(Continued)

(51) Int. Cl.
  *G01S 13/93* (2006.01)
  *G01S 7/35* (2006.01)
  *G01S 7/36* (2006.01)

(52) U.S. Cl.
  CPC ............ *G01S 7/352* (2013.01); *G01S 7/36* (2013.01); *G01S 13/931* (2013.01); *G01S 2007/358* (2013.01); *G01S 2013/9321* (2013.01)

(58) Field of Classification Search
  CPC .................................... G01S 7/352; G01S 7/36
  (Continued)

(56) References Cited

U.S. PATENT DOCUMENTS

| 1,882,128 A | 10/1932 | Fearing |
| 3,735,398 A | 5/1973 | Ross |

(Continued)

FOREIGN PATENT DOCUMENTS

| EP | 2821808 | 7/2015 |
| FR | 2751086 | 1/1998 |

(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

(Continued)

*Primary Examiner* — Marcus Windrich
(74) *Attorney, Agent, or Firm* — Gardner, Linn, Burkhart & Flory

(57) ABSTRACT

A radar sensing system for a vehicle includes transmit and receive pipelines. The transmit pipeline includes transmitters able to transmit radio signals. The receive pipeline includes receivers able to receive signals. The received signals are transmitted signals that are reflected from an object. The transmit pipeline phase modulates the signals before transmission, as defined by a first binary sequence. The receive pipeline comprises an analog to digital converter (ADC) for sampling the received signals. The transmit pipeline includes a pseudorandom binary sequence (PRBS) generator for outputting a second binary sequence of bits with an equal probability of 1 and 0. The first binary sequence is defined by least significant bit (LSB) outputs from the ADC and the second binary sequence of bits. The first binary sequence comprises a truly random unbiased sequence of bits with an equal probability of 1 and 0.

26 Claims, 19 Drawing Sheets

Related U.S. Application Data

(60) Provisional application No. 62/338,792, filed on May 19, 2016, provisional application No. 62/327,017, filed on Apr. 25, 2016.

(58) Field of Classification Search
USPC .............................................. 342/16, 70–72
See application file for complete search history.

(56) References Cited

U.S. PATENT DOCUMENTS

| | | | |
|---|---|---|---|
| 3,750,169 | A | 7/1973 | Strenglein |
| 3,896,434 | A | 7/1975 | Sirven |
| 4,939,685 | A | 7/1990 | Feintuch |
| 5,034,906 | A * | 7/1991 | Chang ................ G06F 7/584 708/250 |
| 5,151,702 | A * | 9/1992 | Urkowitz ............ G01S 13/522 342/116 |
| 5,175,710 | A | 12/1992 | Hutson |
| 5,218,619 | A | 6/1993 | Dent |
| 5,341,141 | A | 8/1994 | Frazier et al. |
| 5,345,470 | A | 9/1994 | Alexander |
| 5,657,023 | A | 8/1997 | Lewis et al. |
| 5,892,477 | A * | 4/1999 | Wehling ............... G01S 7/352 342/18 |
| 5,917,430 | A | 6/1999 | Greneker, III et al. |
| 5,920,285 | A | 7/1999 | Benjamin |
| 5,931,893 | A | 8/1999 | Dent et al. |
| 5,959,571 | A | 9/1999 | Aoyagi et al. |
| 6,069,581 | A | 5/2000 | Bell et al. |
| 6,121,918 | A | 9/2000 | Tullsson |
| 6,184,829 | B1 | 2/2001 | Stilp |
| 6,191,726 | B1 | 2/2001 | Tullsson |
| 6,288,672 | B1 | 9/2001 | Asano et al. |
| 6,347,264 | B2 | 2/2002 | Nicosia et al. |
| 6,400,308 | B1 | 6/2002 | Bell et al. |
| 6,614,387 | B1 | 9/2003 | Deadman |
| 6,624,784 | B1 | 9/2003 | Yamaguchi |
| 6,674,908 | B1 | 1/2004 | Aronov |
| 6,714,956 | B1 | 3/2004 | Liu et al. |
| 6,747,595 | B2 | 6/2004 | Hirabe |
| 6,768,391 | B1 | 7/2004 | Dent et al. |
| 7,289,058 | B2 | 10/2007 | Shima |
| 7,299,251 | B2 | 11/2007 | Skidmore et al. |
| 7,338,450 | B2 | 3/2008 | Kristoffersen et al. |
| 7,545,310 | B2 | 6/2009 | Matsuoka |
| 7,545,321 | B2 | 6/2009 | Kawasaki |
| 7,564,400 | B2 | 7/2009 | Fukuda |
| 7,847,731 | B2 | 12/2010 | Wiesbeck et al. |
| 8,049,663 | B2 | 11/2011 | Frank et al. |
| 8,154,436 | B2 | 4/2012 | Szajnowski |
| 8,330,650 | B2 | 12/2012 | Goldman |
| 8,390,507 | B2 | 3/2013 | Wintermantel |
| 8,532,159 | B2 | 9/2013 | Kagawa et al. |
| 8,547,988 | B2 | 10/2013 | Hadani et al. |
| 8,686,894 | B2 | 4/2014 | Fukuda et al. |
| 8,694,306 | B1 | 4/2014 | Short et al. |
| 9,121,943 | B2 | 9/2015 | Stirling-Gallacher et al. |
| 9,239,378 | B2 | 1/2016 | Kishigami et al. |
| 9,239,379 | B2 | 1/2016 | Burgio et al. |
| 9,282,945 | B2 | 3/2016 | Smith et al. |
| 2002/0004692 | A1 | 1/2002 | Nicosia et al. |
| 2002/0075178 | A1 | 6/2002 | Woodington et al. |
| 2003/0058166 | A1 | 3/2003 | Hirabe |
| 2004/0015529 | A1 | 1/2004 | Tanrikulu et al. |
| 2006/0036353 | A1 | 2/2006 | Wintermantel |
| 2006/0114324 | A1 | 6/2006 | Farmer et al. |
| 2006/0181448 | A1 | 8/2006 | Natsume et al. |
| 2007/0018886 | A1 | 1/2007 | Watanabe et al. |
| 2007/0132633 | A1 | 6/2007 | Uchino |
| 2007/0152871 | A1 | 7/2007 | Puglia |
| 2007/0164896 | A1 | 7/2007 | Suzuki et al. |
| 2007/0188373 | A1 | 8/2007 | Shirakawa et al. |
| 2008/0208472 | A1 | 8/2008 | Morcom |
| 2009/0079617 | A1 | 3/2009 | Shirakawa et al. |
| 2009/0121918 | A1 | 5/2009 | Shirai et al. |
| 2009/0212998 | A1 * | 8/2009 | Szajnowski ........... G01S 13/106 342/204 |
| 2009/0237293 | A1 | 9/2009 | Sakuma |
| 2009/0295623 | A1 * | 12/2009 | Falk ....................... G01S 7/023 342/109 |
| 2010/0116365 | A1 | 5/2010 | McCarty |
| 2010/0198513 | A1 | 8/2010 | Zeng et al. |
| 2011/0006944 | A1 | 1/2011 | Goldman |
| 2011/0279307 | A1 | 11/2011 | Song |
| 2011/0292971 | A1 | 12/2011 | Hadani et al. |
| 2013/0027240 | A1 | 1/2013 | Chowdhury |
| 2013/0169485 | A1 | 7/2013 | Lynch |
| 2013/0176154 | A1 | 7/2013 | Bonaccio et al. |
| 2013/0314271 | A1 | 11/2013 | Braswell et al. |
| 2014/0085128 | A1 | 3/2014 | Kishigami et al. |
| 2014/0111372 | A1 | 4/2014 | Wu |
| 2014/0159948 | A1 | 6/2014 | Ishimori et al. |
| 2015/0061922 | A1 | 3/2015 | Kishigami |
| 2015/0247924 | A1 | 9/2015 | Kishigami et al. |
| 2015/0323660 | A1 | 11/2015 | Hampikian |
| 2016/0003939 | A1 | 1/2016 | Stainvas et al. |
| 2016/0018511 | A1 | 1/2016 | Nayyar et al. |
| 2016/0041260 | A1 * | 2/2016 | Cao ....................... G01S 7/282 342/129 |
| 2016/0084941 | A1 | 3/2016 | Hassan |
| 2016/0084943 | A1 | 3/2016 | Arage |
| 2016/0139254 | A1 | 5/2016 | Wittenberg |
| 2017/0023661 | A1 * | 1/2017 | Richert ................... G01S 7/02 |

FOREIGN PATENT DOCUMENTS

| | | |
|---|---|---|
| WO | WO2015175078 | 11/2015 |
| WO | WO2015185058 | 12/2015 |
| WO | WO2016/011407 | 1/2016 |
| WO | WO2016030656 | 3/2016 |

OTHER PUBLICATIONS

Zhou et al., "Linear extractors for extracting randomness from noisy sources," In: Information Theory Proceedings (ISIT), 2011 IEEE International Symposium on Oct. 3, 2011.

Fraser, "Design and simulation of a coded sequence ground penetrating radar," In: Diss. University of British Columbia, Dec. 3, 2015.

* cited by examiner

How Digital Radar works

Applying a Binary Code to the inverter block:

Transmit sequence:

Receiving a Binary Code :

Receive sequence:

The returning wave form is strongly correlated with the used binary code.

Random Number Reseeding PRBS

Can also change the PRBS taps with random numbers to further make it difficult

Figure 17: Multi-level Unbiased

| Flip Number | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Level 0 | H | H | T | T | H | T | H | H | H | T | H | H | H | T |
| Level 1 | H | | T | | $b_2$ | | H | | $b_3$ | | H | | $b_4$ | |
| Level 2 | $b_1$ | | | | | | H | | | | | | | |

FIGURE 18: Advanced Multi-level unbiased.

Level 0    H H  T T  H T  H H  H T  H H  H T
            ∨    ∨    ∨    ∨    ∨    ∨    ∨
Level 1     H    T   (b)   H   (b)   H   (b)

Level A     H    H    T    H    T    H    T

Level 1    H T  H H
            ∨    ∨
Level 2    (b)   H

Level 1A    T    H

Level A    H H  T H  T H T
            ∨    ∨    ∨
Level A1    H   (b)  (b)

Level B     H    T    T

VEHICULAR RADAR SENSING SYSTEM UTILIZING HIGH RATE TRUE RANDOM NUMBER GENERATOR

CROSS REFERENCE TO RELATED APPLICATIONS

This application is a continuation of U.S. patent application Ser. No. 15/204,003, filed Jul. 7, 2016, now U.S. Pat. No. 9,575,160, which claims the filing benefits of U.S. provisional applications, Ser. No. 62/338,792, filed May 19, 2016, and Ser. No. 62/327,017, filed Apr. 25, 2016, which are hereby incorporated herein by reference in their entireties.

FIELD OF THE INVENTION

The present invention is directed to radar systems, and in particular to radar systems for vehicles.

BACKGROUND OF THE INVENTION

The use of radar to determine range and velocity of objects in an environment is important in a number of applications including automotive radar and gesture detection. A radar typically transmits a signal and listens for the reflection of the signal from objects in the environment. Transmitting signals that are not susceptible to spoofing is an important consideration in the design of radar systems.

SUMMARY OF THE INVENTION

Embodiments of the present invention provide methods and a system for producing a highly efficient, high-output, truly random number generator that prevents a transmitted waveform from being determinable by remote observers, and thus making it difficult to conduct spoofing attacks in an automobile application and other radar systems. Using truly random codes in code-based radar systems prevent spoofing that could create false actions or inaction in automotive radars. The output samples of an analog to digital convertor (ADC) may be used to generate a high throughput source of true random numbers that may be used in conjunction with pseudorandom binary sequence (PRBS) values to generate truly random numbers at a desired phase modulation rate (chip rate). In an aspect of the present invention, an exemplary implementation uses a true random stream of binary values that is XORed with the PRBS codes to ensure the desired chip rate is met.

According to an aspect of the present invention, a radar sensing system for a vehicle includes a transmit pipeline and a receive pipeline. The transmit pipeline comprises a plurality of transmitters configured for installation and use on a vehicle, and operable to transmit radio signals. The receive pipeline comprises a plurality of receivers configured for installation and use on the vehicle, and operable to receive radio signals. The transmitted radio signals are reflected from objects and received at the receivers. The transmit pipeline is further operable to phase modulate the radio signals before transmission. The phase modulation is defined by a first binary sequence. The receive pipeline comprises at least one analog to digital converter (ADC) operable to sample the received radio signals. The transmit pipeline further comprises a pseudorandom binary sequence (PRBS) generator operable to output a second binary sequence of bits with an equal probability of 1 and 0. The transmit pipeline is further operable to define the first binary sequence at least in part by least significant bits (LSB) outputs from the at least one ADC and the second binary sequence of bits output from the PRBS generator. The first binary sequence comprises a sequence of bits with an unknown, possibly unequal statistical probability of 1 and 0. Truly random bits are generated from the first truly random, possibly biased, sequence by considering two bits at a time or more than two bits at a time and mapping them as described selectively to bits which are truly random and unbiased. The first binary sequence may be used after operating on the second binary sequence as described to generate a truly random unbiased binary sequence of 1 and −1, which may be used to generate phase modulations of π and −π.

In an aspect of the present invention, a method for producing high-rate truly random binary numbers for a binary based modulator of a vehicle radar sensing system includes providing a radar sensing system comprising a transmit pipeline comprising a plurality of transmitters configured for installation and use on a vehicle and a receive pipeline comprising a plurality of receivers configured for installation and use on the vehicle. The signals received by the receivers are signals transmitted by the plurality of transmitters and reflected from objects in the environment. The method also includes phase modulating the signals before they are transmitted by the plurality of transmitters. The phase modulation is defined by a first binary sequence. The received radio signals are sampled with at least one analog to digital converter (ADC). Pseudorandom binary sequence (PRBS) values are generated with a PRBS generator. The PRBS generator is operable to output a second binary sequence of bits that have an equal statistical probably of 1 and 0. The first binary sequence is defined at least in part by using least significant bits (LSB) outputs from the at least one ADC and the second binary sequence of bits output from the PRBS generator. The first binary sequence comprises a sequence of bits with an unknown, possibly unequal statistical probability of 1 and 0. The first binary sequence may be used after operating on the second binary sequence to generate a truly random unbiased binary sequence of 1 and −1, which may be used to generate phase modulations of π and −π.

These and other objects, advantages, purposes and features of the present invention will become apparent upon review of the following specification in conjunction with the drawings.

BRIEF DESCRIPTION OF THE DRAWINGS

FIG. 17 is a diagram illustrating an exemplary realization of an algorithm for generating truly random numbers in accordance with the present invention; and FIG. 18 is a diagram illustrating an exemplary realization of a multi-level algorithm for generating truly random numbers in accordance with the present invention.

DESCRIPTION OF THE PREFERRED EMBODIMENTS

Figure 1:
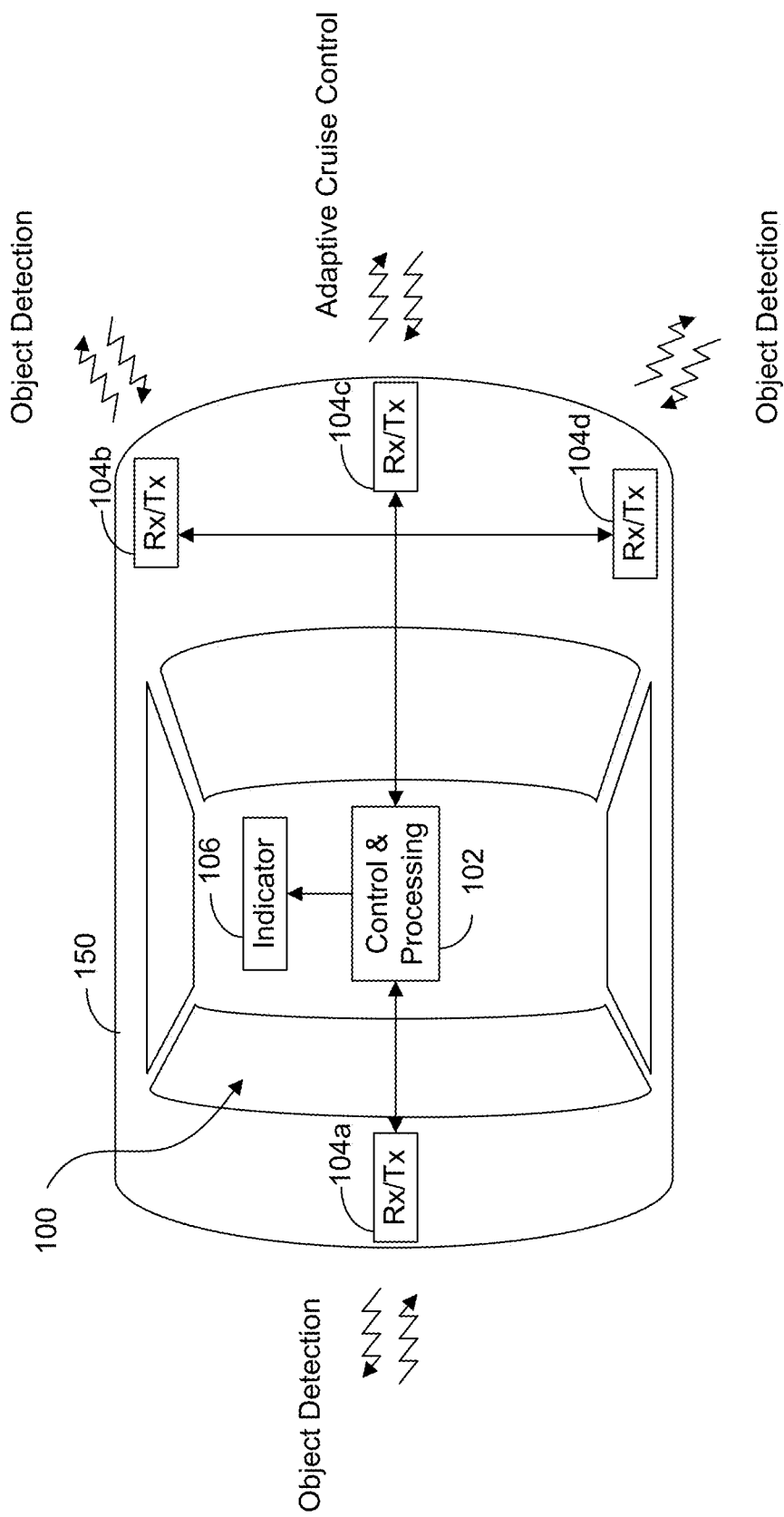
FIG. 1 is a plan view of an automobile equipped with a radar system in accordance with the present invention.

The present invention will now be described with reference to the accompanying figures, wherein numbered elements in the following written description correspond to like-numbered elements in the figures. Methods and systems of the present invention may achieve a high-rate truly random number generation that may prevent a transmitted waveform from being determinable or predictable by remote observers. Exemplary embodiments may make it more difficult to conduct spoofing attacks in an automobile application and other radar system applications. Truly random codes (binary values) used in code-based radar systems (for example, modulating waveforms defined by binary code sequences) prevent spoofing that could create false actions or inaction in automotive radars. According to an aspect of the present invention, an analog to digital converter (ADC) generates samples of received signals and may be used as a source of high-throughput random binary values. These random binary values may be used in conjunction with pseudorandom binary sequence (PRBS) values (produced by PRBS generators) to ensure that a truly random bit stream of codes with a desired output rate is achieved. A PRBS generator may be added to the radar system to ensure that the rate of code generation is maintained. In an aspect of the present invention, an exemplary implementation uses a stream of truly random unbiased binary values that is XORed with PRBS values to ensure that the output bit stream of truly random binary values is also output at the desired chip rate. Therefore, a high-throughput, truly random unbiased binary sequence of codes is available for code-based phase modulation of a radio signal.

A radar system utilizes one or more transmitters to transmit signals. These signals are reflected from objects in the environment, also called targets, by one or more receivers of the radar system. The receivers of the radar system may be considered part of a receive pipeline that outputs complex valued digitized samples (i.e., values comprising a mathematical real component and a mathematical imaginary component) to a processor. The complex valued digitized samples are correlated with various time-delayed replicas of the transmitted signals for different receivers. These samples are arranged in two-dimensional arrays known as time slices. The samples are placed into respective range bins of the two-dimensional array (as used herein, a range bin refers to a distance range corresponding to a particular time delay corresponding to the round trip time of the radar signal from a transmitter, to the target/object, and back to the receiver). The receivers of the radar system define an x-axis of the two-dimensional time slice and the range bins define a y-axis of the two-dimensional time slice. Another time slice comprising complex valued samples is generated every 2-30 microseconds. Over a longer time interval, herein referred to as a "scan" (typically, in a duration of 1-60 milliseconds or longer), multiple time slices are accumulated to form a three-dimensional radar data cube. An x-axis of the three-dimensional radar data cube is defined by time (of each respective time slice requiring 2-30 microseconds), while the receivers (or virtual receivers) define a z-axis of the three-dimensional radar data cube and the range bins and their corresponding time delays define a y-axis of the three-dimensional radar data cube. A radar data cube may have a preselected or dynamically defined quantity of time slices. For example, a radar data cube may include a 100 time slices or a 1000 time slices of data.

The complex-valued samples of the received signals are the product of a correlation between multiple time-delayed replicas of the transmitted signals—with a time-delayed replica corresponding to each range bin—and the received signals. When a particular time-delayed replica in a particular range bin correlates highly with the received signal, it is an indication of the time delay (i.e., range of the target/object) for the transmitted signal that is received after reflecting from a target/object. As discussed herein, each time slice contains one sample in a time series of samples upon which Doppler processing is performed (e.g., Fast Fourier Transform). In other words, a time series of samples comprises the samples of a particular range bin for a particular receiver (or virtual receiver). The longer the chain of time series of samples, the higher the Doppler resolution.

The transmitted radio signals are reflected from objects in the environment and are received back at the radar receivers (or virtual receivers). The transmitted signal from each radar transmitter consists of a baseband signal which is upconverted to an RF signal by an RF upconverter followed by an antenna. The received signal at each radar receiver antenna is downconverted by an RF downconverter to a complex baseband signal. The baseband transmitted radio signals and the reflected radio signals after downconversion in the receiver are provided to the processor. As an example, a baseband signal used for transmission might consist of repeated sequences of random or pseudo-random binary values for one transmitter, e.g., (−1, −1, −1, −1, 1, 1, 1, −1, 1, 1, −1, −1, 1, −1, 1), although any sequence, including non-binary sequences and non-periodic sequences could be used and different sequences would be used for different transmitters. In an exemplary aspect of the present invention, the sequences of random binary values may be provided by a truly random unbiased number generator. The random bit stream from the truly random number generator may be XORed with an output of pseudorandom binary values from a pseudorandom number generator (PRNG). XORing the binary values from the pseudorandom number generator and the truly random number generator may provide for a highly efficient, high-output unbiased randomized serial stream of bit values.

The transmission signal can be upconverted to an RF signal by mixing the transmission signal with a local oscillator. At the receiver (receive pipeline), the received signal is downconverted by typical amplification, filtering, and mixing with in-phase and quadrature-phase components of an oscillator. The resulting signal after downconversion is correlated with different delays (time shifts) of replicas of the transmitted sequence to produce a complex correlation value for each period of the binary sequence. A particular correlator that has a replica that is matched in delay to the time delay of the reflected signal from an object would produce a large magnitude complex correlator output. A single correlator will produce a sequence of correlator outputs that will be large if the reflected signal has a delay that matches the delay of the replica of the baseband transmitted signal. If there is a different velocity of the radar system and the object causing the reflection, there will be a Doppler shift in the frequency of the reflected signal relative to the transmitted signal. A sequence of correlator outputs for one particular delay will have complex values that rotate at a rate related to the Doppler shift. Using a sequence of correlator outputs (also referred to as a scan), the Doppler shift may be estimated and thus the velocity of the object in the environment. The longer the sequence of correlator outputs used to estimate the Doppler frequency, the greater the accuracy and resolution of the estimation of the Doppler frequency, and thus the greater accuracy in estimating the velocity of the object.

There may be scans for different correlators that use replicas of the transmitted signal with different delays. Because there are multiple transmitters and multiple receivers, there may be correlators that process a received signal at each receiver that are matched to a particular transmitted signal by a particular transmitter. Each pair of transmitter-receiver is called a "virtual receiver" (a radar system preferably has 4 virtual receivers, or more preferably 32 virtual receivers, and most preferably 256 or more virtual receivers). The receive pipeline of the radar system will thus generate a sequence of correlator outputs for each possible delay and for each virtual receiver. This set of data is called a radar data cube (RDC). The delays are also called range bins. The part of the radar data cube for one point in the sequence of correlator outputs is called a time slice, and it contains one correlator output for each range bin and virtual receiver combination. Storing the radar data cube can involve large amount of memory, as its size depends on the desired number of virtual receivers (for example, 4-64 or more virtual receivers), the desired number of range bins (for example, 100-500 or more range bins), and the desired number of time slices (for example, 200-3000 or more time slices).

The complex-valued digitized samples contained in a three-dimensional radar data cube may be processed, preferably by a processor established as a CMOS processor and coprocessor on a common/same semiconductor substrate, typically a silicon substrate. In one embodiment, the processor comprises fixed function and programmable CPUs and/or programmable logic controls (PLCs). Preferably, the system will be established with a radar system architecture (including, for example, analog RF circuitry for the radar, processor(s) for radar processing, memory module(s), and other associated components of the radar system) all on a common/same semiconductor substrate. The system may preferably incorporate additional processing capabilities (such as, for example, image processing of image data captured by one or more vehicle cameras such as by utilizing aspects of the systems described in U.S. Pat. Nos. 5,877,897; 5,796,094; 6,396,397; 6,690,268 and 5,550,677, which are hereby incorporated herein by reference in their entireties) within the common/same semiconductor substrate as well.

The ability of a continuous wave radar system to distinguish multiple targets is dependent upon the radar system's range, angle, and Doppler resolutions. Range resolution is limited by a radar's bandwidth (i.e., the chip rate in a phase modulated continuous wave radar), while angle resolution is limited by the size of the antenna array aperture. Meanwhile, increasing Doppler resolution only requires a longer scan. A high Doppler resolution is very valuable because no matter how close two objects or targets are to each other, as long as they have slightly differing radial velocity (their velocity towards or away from the radar system), they can be distinguished by a radar system with a high enough Doppler resolution. Consider a walking adult next to a walking child, where the adult is moving towards the radar system at 1.5 meters per second while the child is moving towards the radar system at 1.2 meters per second (ignoring how fast the radar system may be moving). If the Doppler resolution of the radar system is high enough, the radar system will be able to distinguish the two targets. However, if the radar system is only able to achieve Doppler resolutions of up to an exemplary 0.5 meters per second, the radar system will be unable to distinguish the two targets. Preferably, the Doppler resolution is 1 meter per second (m/s), more preferably 0.1 m/s, and most preferably less than 0.05 m/s.

FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more virtual receivers 104a-104d. Other configurations are also possible. FIG. 1 illustrates receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

Figure 2A:
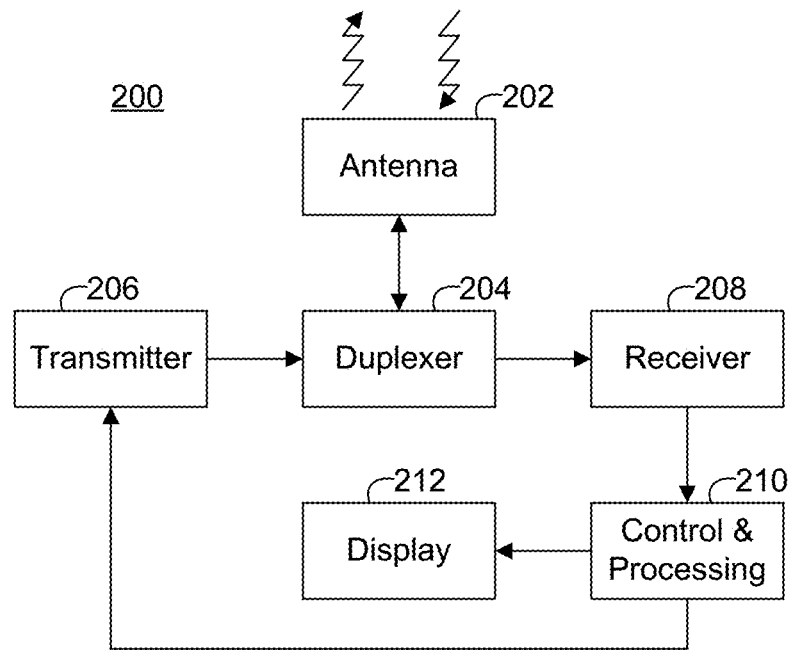
FIG. 2A and FIG. 2B are block diagrams of radar systems in accordance with the present invention.
Figure 2B:
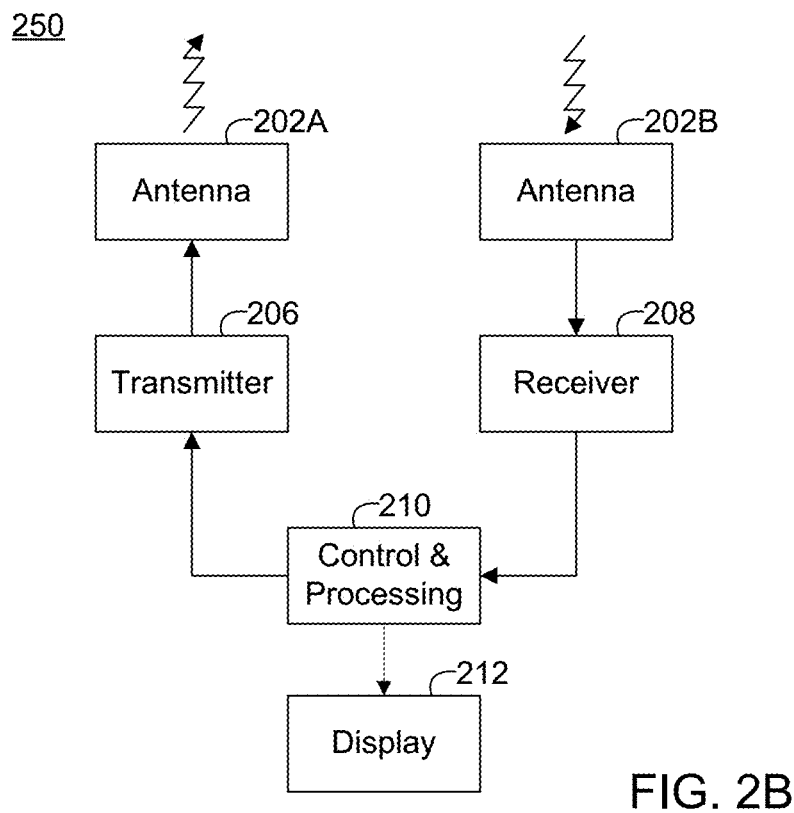

FIG. 2A illustrates an exemplary radar system 200 with an antenna 202 that is time-shared between a transmitter 206 and a receiver 208 via a duplexer 204. As also illustrated in FIG. 2A, output from the receiver 208 is received by a control and processing module 210 that processes the output from the receiver 208 to produce display data for the display 212. As discussed herein, the control and processing module 210 is also operable to produce a radar data output that is provided to other control units. The control and processing module 210 is also operable to control the transmitter 206. FIG. 2B illustrates an alternative exemplary radar system 250 with a pair of antennas 202a, 202b, a separate antenna 202a for the transmitter 206 and another antenna 202b for the receiver 208. While pulse radar systems may use shared or separate antennas, continuous wave radars (discussed herein) will use separate antennas (for transmitting and receiving) because of their continuous operation.

The radar sensing system of the present invention may utilize aspects of the radar systems described in U.S. provisional applications, Ser. No. 62/319,613, filed Apr. 7, 2016, Ser. No. 62/327,003, filed Apr. 25, 2016, Ser. No.

62/327,004, filed Apr. 25, 2016, Ser. No. 62/327,005, filed Apr. 25, 2016, Ser. No. 62/327,006, filed Apr. 25, 2016, Ser. No. 62/327,015, filed Apr. 25, 2016, Ser. No. 62/327,016, filed Apr. 25, 2016, Ser. No. 62/327,018, filed Apr. 25, 2016, Ser. No. 62/332,544, filed May 6, 2016, and/or Ser. No. 62/336,966, filed May 16, 2016, which are all hereby incorporated by reference herein in their entireties.

There are several types of signals used in radar systems. One type of radar signal is known as a frequency modulated continuous waveform (FMCW). In this type of system, the transmitter of the radar system sends a continuous signal in which the frequency of the signal varies. This is sometimes called a chirp radar system. At the receiver a matched filter can be used to process the received signal. The output of the matched filter is a so-called "pulse-compressed" signal with a pulse duration inversely proportional to the bandwidth used in the chirp signal.

Figure 6:
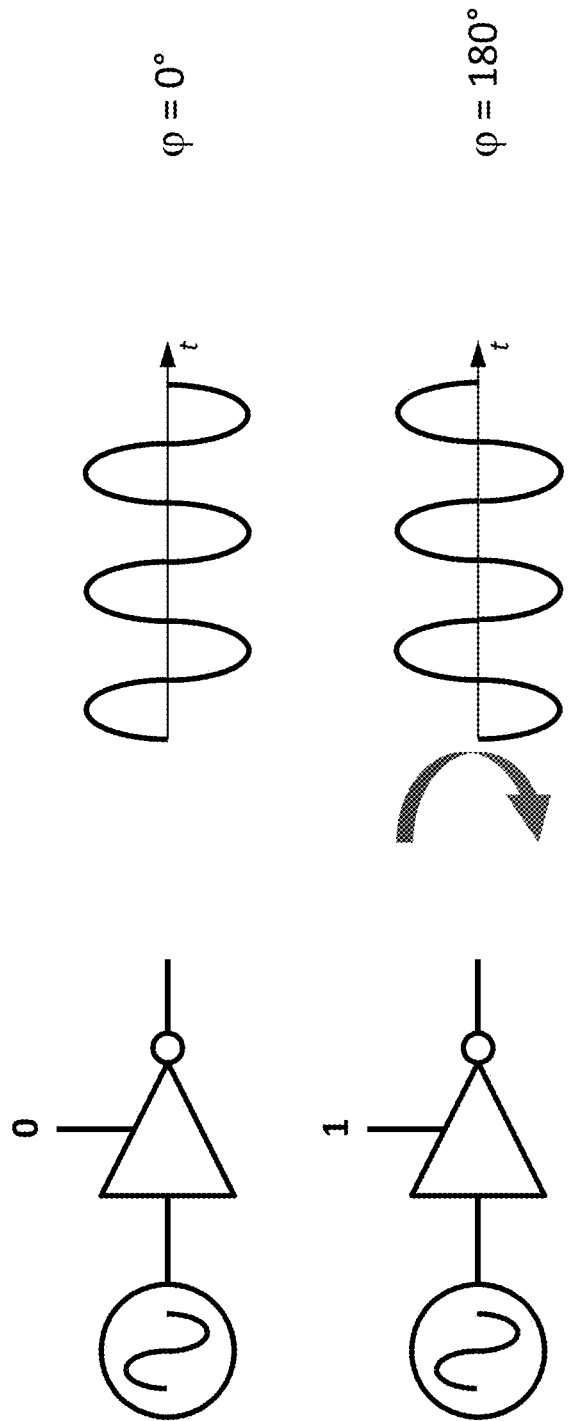
FIGS. 6-8 illustrate aspects of how digital radar works.
Figure 7:
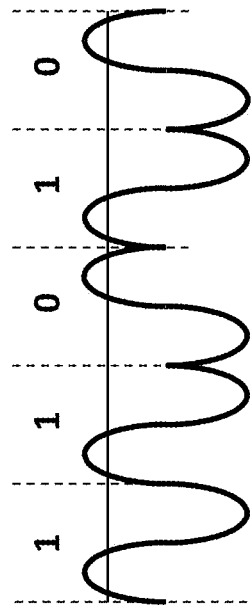
Figure 7:
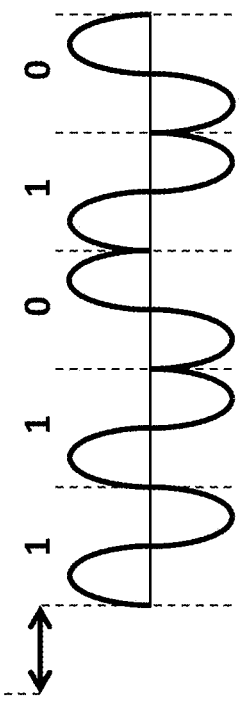
Figure 7:
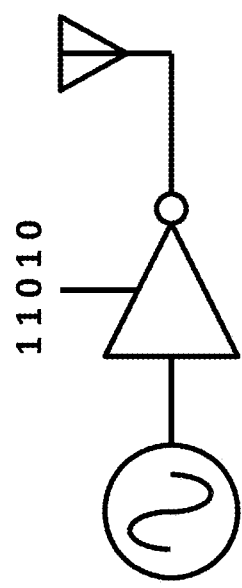
Figure 7:
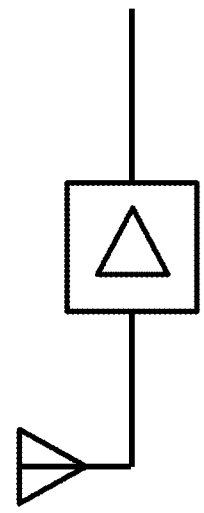
Figure 8:
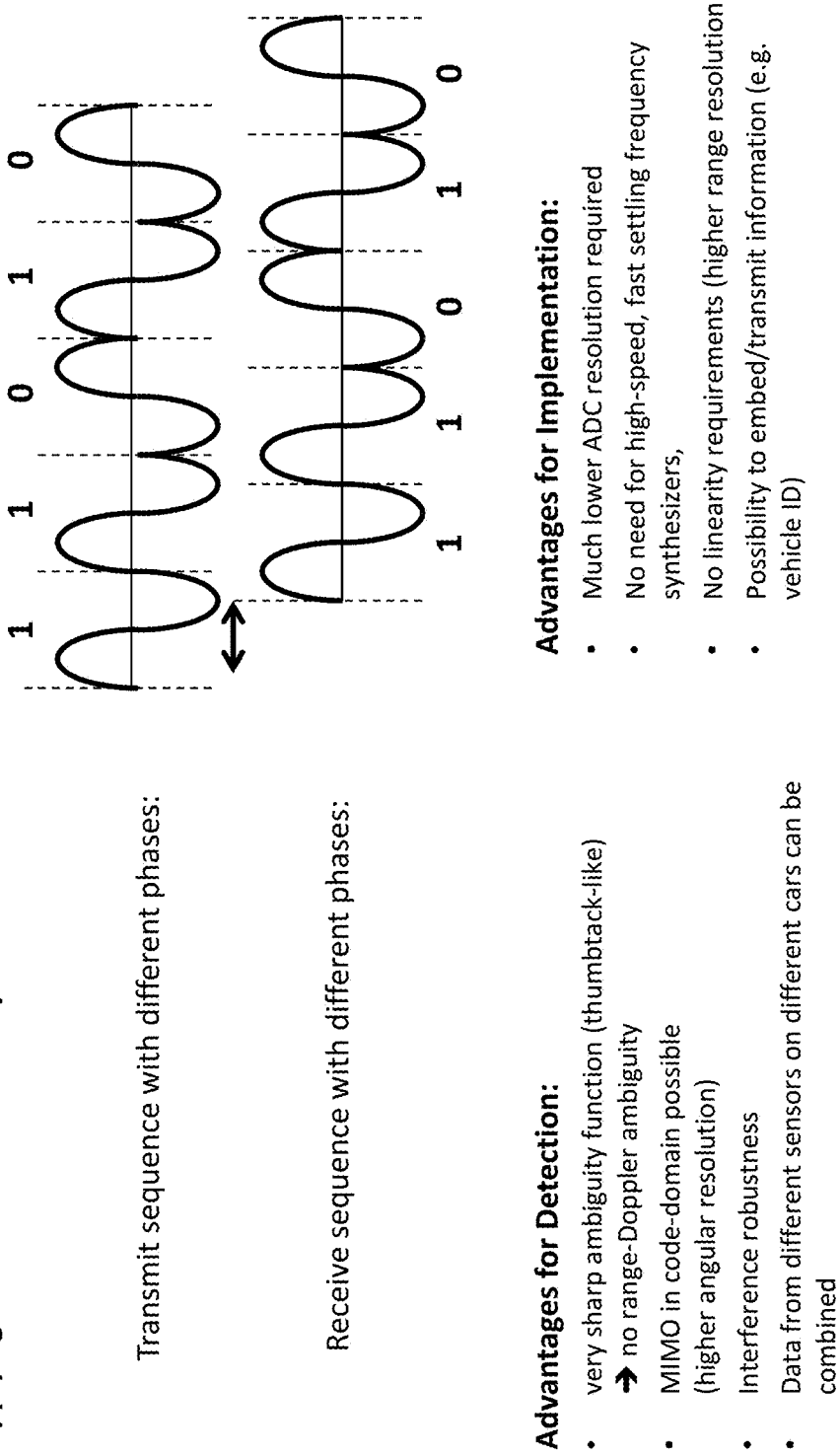

Another type of radar signal is known as a phase modulated continuous waveform (PMCW). For this type of signal, the phase of the transmitted signal is changed according to a certain pattern or code, sometimes called the spreading code, known at the radar receiver (see FIGS. 6-8). The faster the phase is changed, the wider the bandwidth of the transmitted signal. This is sometimes called spread-spectrum because the signal power is spread over a wide bandwidth. As illustrated in FIGS. 6-8, the pattern may be implemented as a pseudorandom binary code, where 1s and 0s indicate a positive or negative phase shift. In an aspect of the present invention, the pattern may be implemented as a truly random serialized bit stream. As also illustrated in FIGS. 7 and 8, a phase shift does not always affect the waveform (e.g., a binary code sequence of 1, 1 or 0, 0 does not change the phase of the waveform for the second 1 or 0). In an aspect of the present invention, there may be different types of codes, with each transmitter of a radar system using a separate code. In other modes each transmitter transmits with a single code that is modulated according to a Hadamard transform.

At the receiver, a matched filter is used that produces a so-called pulse compressed signal with time resolution proportional to the inverse bandwidth of the transmitted signal. Codes with good autocorrelation values are important in single transmitter, single receiver, phase-modulated continuous wave radars.

Radars with a single transmitter and a single receiver can determine distance to a target but cannot determine a direction or an angle of a target from the radar sensor or system. To achieve angular information, either multiple transmitters or multiple receivers or both are needed. The larger the number of transmitters and receivers, the better the resolution possible. A system with multiple transmitters and multiple receivers is also called a multiple-input, multiple-output or MIMO system. With multiple transmitter, multiple receiver radar systems, the receive pipeline of the radar system will have a matched filter for each of the transmitter codes. As discussed herein, a number of virtual receivers is defined by the number of transmitters and physical receivers (quantity of transmitters times quantity of physical receivers equals the quantity of virtual receivers). A receiver may be referred to as a virtual receiver. A radar system with only a single transmitter will have virtual receivers that are physical receivers, but may still be referred to as virtual receivers.

One type of radar system transmits the same type of signal continuously. The signal might be a frequency modulated continuous wave (FMCW) type of waveform that sweeps a continuous wave (CW) signal in frequency across some range of frequencies. Mixing (multiplying) the reflected wave from a target with a replica of the transmitted signal results in a CW signal with a frequency that represents the distance between the radar transmitter/receiver and the target. By sweeping up in frequency and then down in frequency the Doppler frequency can also be determined. Phase modulated continuous wave (PMCW) on the other hand transmits a signal in which the phase is modulated (e.g., with two values $\pi$ and $-\pi$). For a single transmitter, a sequence of phase values—sometimes called a spreading code—that has good autocorrelation properties is required so that ghost targets are minimized. The rate at which the phase is modulated determines the bandwidth of the transmitted signal.

A radar determines the range of an object or the distance to an object by determining how long it takes the echo of the transmitted signal to be heard back at the receive pipeline of the radar. From this measured time delay and knowing that the electromagnetic signals travel at the speed of light (or ultrasonic signals travel at the speed of sound) the distance can be determined. A typical way of determining the time delay is by correlating the received signal with multiple time-delayed replicas of the transmitted signal (via the use of range bins, as discussed herein). When a particular time-delayed replica corresponding to a particular range bin correlates highly with the received signal (which results in a larger amplitude signal as compared to a signal that does not correlate highly with the received signal), it is an indication of the time delay for the transmitted signal that is received after reflecting from an object. Because there can be multiple objects in the environment, there will be multiple time delays for which there will be high correlation. While a virtual receiver could correlate the received signal with all possible delays, generally there is a finite set of delays with which the virtual receiver will correlate (that is, the range bins).

The ranges corresponding to the different time delays generated by replica signals are the above mentioned range bins. They may also be known as "range gates." The accuracy of range determination increases as the bandwidth of the transmitted signal increases (as the rate at which the phase of the signal changes) and as the number of time-delay replicas increase. A virtual receiver that uses a matched filter may generate correlation values for all possible time delays (each range bin). This matched filter receiver will still have a range resolution that depends on the bandwidth of the transmitted signal.

A radar system can determine the velocity of an object by measuring the frequency offset between the transmitted signal and the received signal. The signal reflecting from a moving object will have a frequency shift relative to the transmitted signal. This is called the Doppler Effect and the frequency shift is called the Doppler Shift. Doppler is most noticeable with regards to trains passing through a road crossing where the frequency of the sound will go down once the train has passed the road crossing. The signal reflected off an object moving toward the radar sensor will have a higher frequency than the transmitted signal, and an object moving away will have a lower frequency. If the radar sensor is also moving, then it is the relative velocity between the radar sensor and the object that will determine the amount of frequency shift. Thus, measuring the frequency shift will determine the relative velocity of an object in the environment. The time duration of the transmitted signal will determine the accuracy or resolution of the Doppler frequency.

The correlation of replicas of the transmitted signal modified at different time delays and different frequency shifts is called the ambiguity function. It is the correlation at different delays and different frequency shifts which are an indication of the range and velocity of the objects in the environment. A virtual receiver calculating the ambiguity function can estimate the range and velocity of objects in the environment.

Because there can be multiple objects in the environment with different ranges and different velocities there may be multiple reflections with different delays and different frequency shifts. It is important in many applications to measure the frequency shift for different objects at different ranges to determine the velocity of individual objects. Each object in a given range will generate a frequency shift that should be estimated.

The frequency shift of a received signal at a particular range bin can be measured by looking at the sequence of phase values of the correlator output of the receive pipeline over a set of correlations. The phase shift AO between two consecutive correlator outputs that are separated in time $\Delta T$ will correspond to a frequency shift, $\Delta f$, that can be determined as $\Delta f = \Delta \phi / \Delta T$. The longer the time duration of the transmitted signal, the more accurate the determination of frequency shift of an object at a particular range bin.

Figure 9:
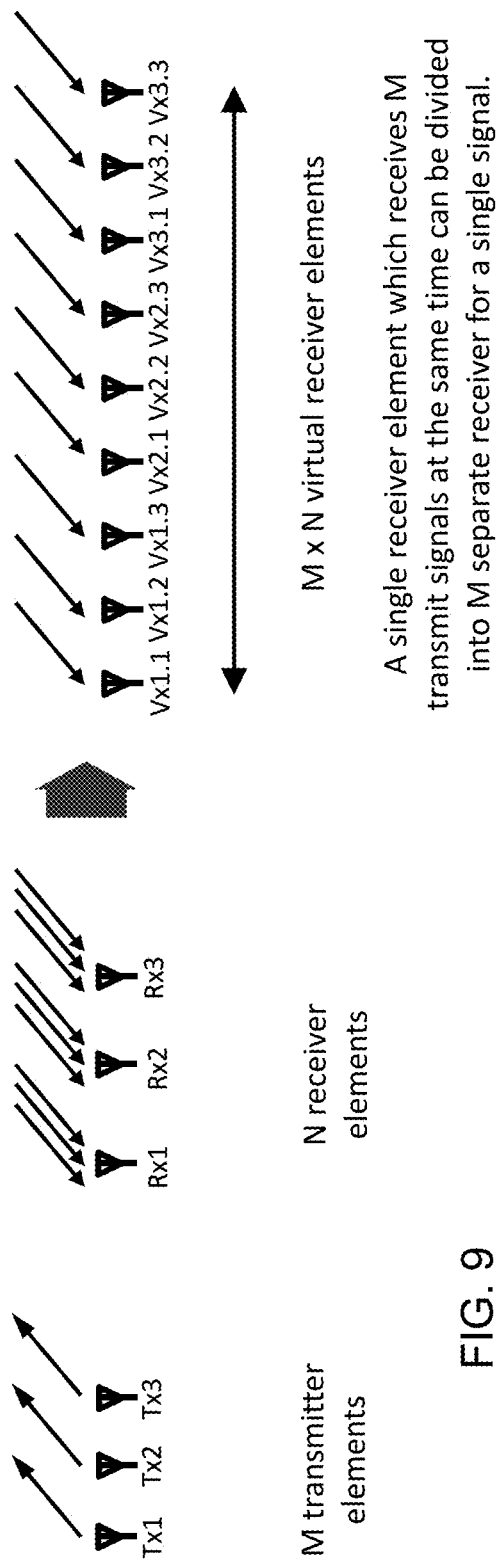
FIG. 9 illustrates capabilities of a multiple transmitter and multiple receiver radar system.

While the description above focused on a single transmitter-receiver pair, if there are $N_T$ transmitters and $N_R$ receivers there will be $N_T \times N_R$ virtual radars, one for each transmitter-receiver pair. For example, a radar system with eight transmitters and eight receivers will have 64 pairs or simply 64 virtual radars or 64 virtual receivers. As illustrated in FIG. 9, when three transmitters (Tx1, Tx2, Tx3) are being received by three receivers (Rx1, Rx2, Rx3), each of the receivers is receiving the transmission from each of the transmitters. Because each of the receivers is receiving all three of the transmissions at the same time, the physical receivers may be "divided" into three separate virtual receivers, each virtual receiver receiving a respective one of the received signals. In a preferred radar system of the present invention, there are 1-4 transmitters and 4-8 receivers, or more preferably 4-8 transmitters and 8-16 receivers, and most preferably 16 or more transmitters and 16-64 or more receivers.

Collecting and storing all the information to determine the range and velocity of each object corresponding to each virtual receiver requires significant memory resources. The required memory resources necessary to achieve sufficient Doppler resolution may run into the tens of megabytes to a 100 megabytes or more. For example, the amount of memory necessary to store the data for a single scan of 1000 time slices from 64 virtual receivers when that scan accumulates samples across 100 range bins for the 64 virtual receivers would be more than 25 megabytes. In accordance with an aspect of the present invention, there are preferably 100 range bins, more preferably 200 range bins, and most preferably 500 range bins in each time slice.

Figure 3:
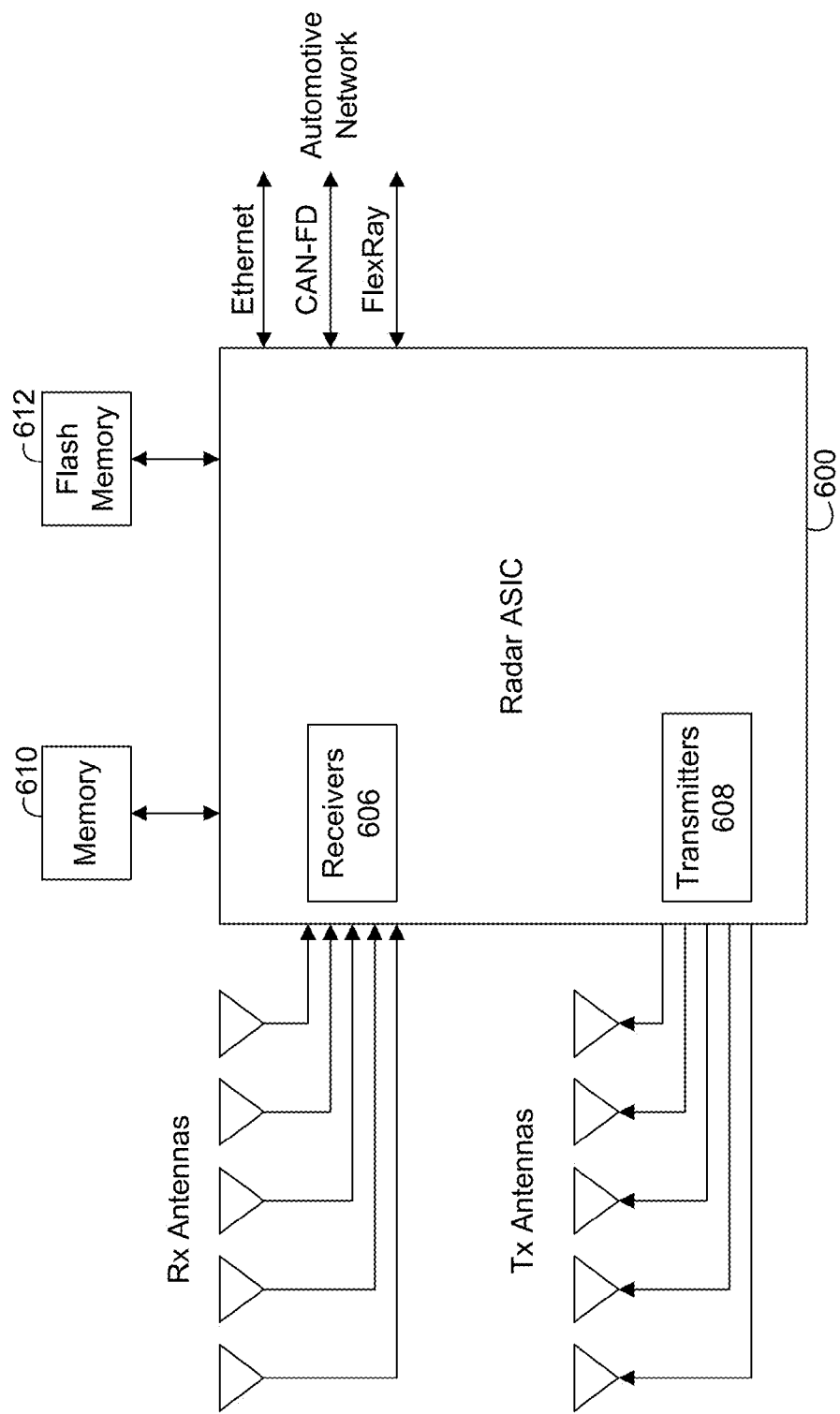
FIG. 3 is a block diagram illustrating a radar system with a plurality of receivers and a plurality of transmitters in accordance with the present invention.

FIG. 3 illustrates an exemplary phase modulated continuous wave radar system 600. As illustrated in FIG. 3, the radar system 600 comprises a plurality of receivers and their respective antennas 606 and a plurality of transmitters and their respective antennas 608. The radar system 600 also includes a flash memory 612, and optionally a random access memory 610. The random access memory 610, for example, an external DRAM, may be used to store radar data cube(s) instead of using the limited internal (on-chip) memory (e.g., SRAM), and may also be used to store selected range bins from a greater number of radar data cubes for concatenating for micro-Doppler processing. The radar system also includes a variety of interconnections to an automotive network, e.g., Ethernet, CAN-FD, and Flexray.

Figure 4:
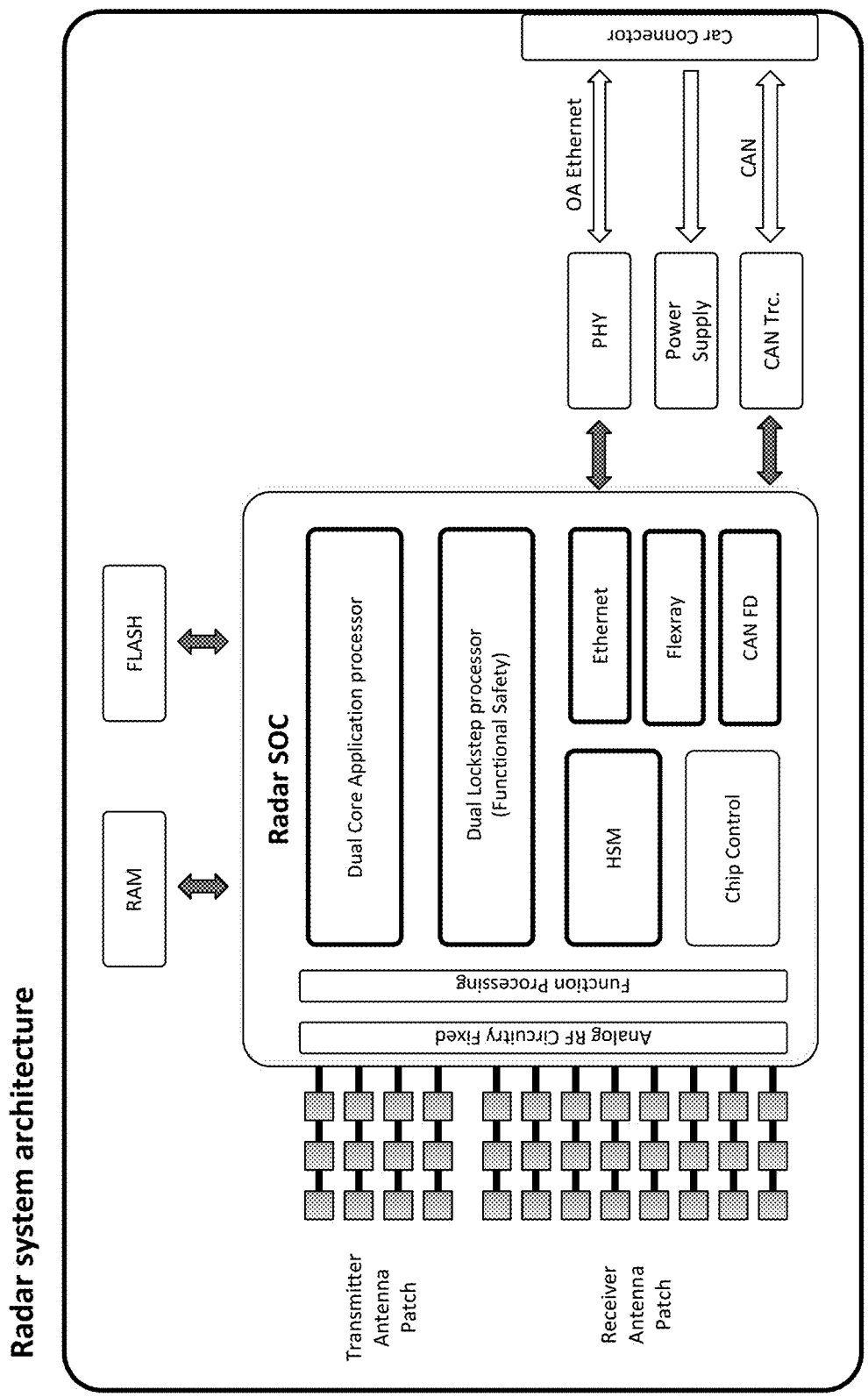
FIG. 4 is a block diagram illustrating another radar system with a plurality of receivers and a plurality of transmitters in accordance with the present invention.
Figure 5:
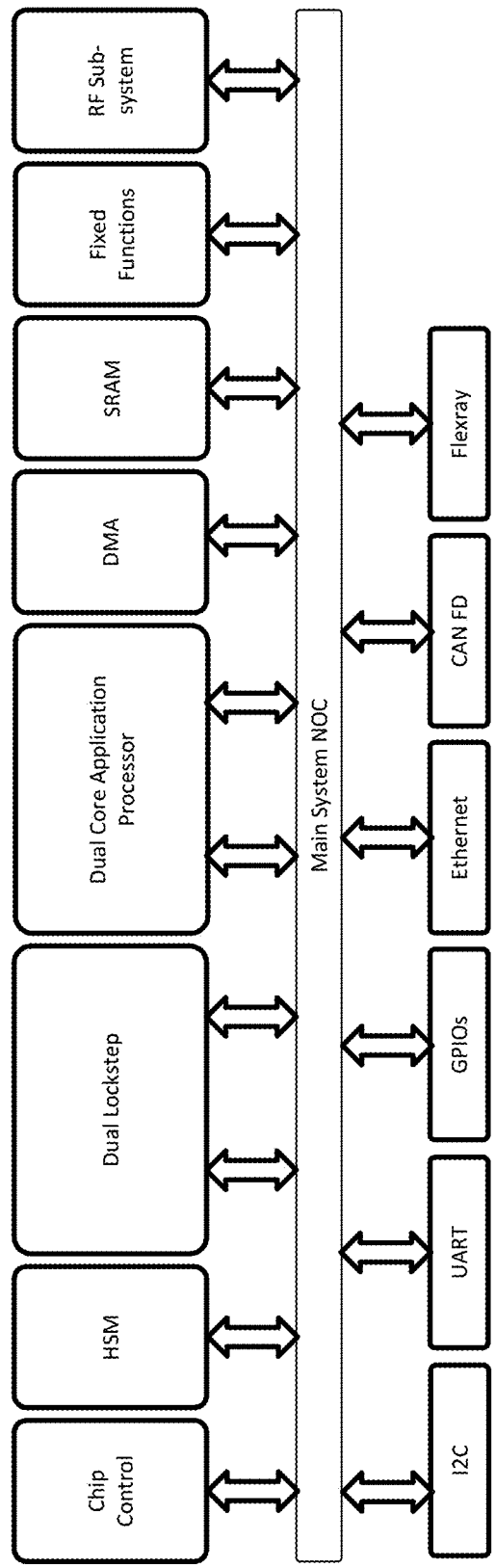
FIG. 5 is a block diagram of an exemplary system on a chip architecture for the radar system of the present invention.

FIG. 4 illustrates another exemplary radar system of the present invention. Similar to the radar system 600 of FIG. 3, the radar system of FIG. 4 comprises a plurality of transmitter and receiver antennas. The radar system of FIG. 4 also includes RAM and flash memories, as well as interconnections to the automobile. FIG. 5 illustrates an exemplary system on chip architecture for the radar system of FIG. 4.

In a radar based system, electronic countermeasures are devices that are designed to trick or deceive radar systems ("spoofer"). There are many well-known spoofing techniques that may cause significant system issues. For example, if a carrier waveform being transmitted is known, it is possible to place a multitude of false targets in front of the target or to make a real target completely disappear. For automotive applications, an active spoofer creating false targets or making real targets disappear could cause dire consequences. These consequences could, for example, include braking maneuvers or the lack thereof, and could cause issues for the automobile being spoofed ("spoofee") and/or surrounding vehicles.

Effective spoofing of a spoofee's radar system by a spoofing system or spoofer requires knowledge by the spoofing system of some key parameters of the FMCW or PMCW system of the spoofee. These key parameters include: carrier waveform, direction, and range. For example, for an FMCW system, the frequency sweep of the transmitted signal may be locked onto with a simple dynamic filter that follows the frequency chirp and thereby determines the carrier waveform. Simple adaptive systems may lock onto fast or slow sweeping chirps in 40 or less samples at 2 GHz (that is, in less than 20 ns of time). Once the frequency sweep is estimated, the direction of the interferer may also be inferred by looking at the phase response of the spoofee's signal with multiple receivers. The signal strength of the direct path can then be estimated or determined directly through direct measurements of the source transmitter. Once the signal, direction, and range of the target are known, a spoofing signal may be generated to synthesize targets at any location in the same direction as the spoofer with any velocity with respect to the spoofee. In addition to generating false targets, cloaking (removing the reflection from the spoofer's system) of the spoofer can be achieved.

It is important to generate signals that cannot be predicted or estimated by a spoofer. Thus, signals based on truly random binary codes (bit values) for the generation of phase modulated continuous waveforms are desired. In accordance with an aspect of the present invention, a pseudorandom binary sequence (PRBS) of bit values may be used. Exemplary PRBS generators use algorithms to output binary sequences that are statistically close to truly random sequences (that is, a statistically equal distribution of 1 s and 0s). The PRBS generator is considered "pseudo" because although a deterministic algorithm is used, the output values of a PRBS generator have nearly the same distribution properties as truly random number generators. For example, the number of 0's produced and the number of 1's produced will be nearly equal. The fraction of pairs of bits produced by a PRBS (i.e., an m-sequence generator) will be nearly $\frac{1}{4}^{th}$ for each pair (00,01,10,11). Many such properties are close to those of truly random number generators. However, knowing a particular sequence of outputs of a PRBS will allow a spoofer to determine the rest of the sequence of outputs because there is a deterministic algorithm that always produces a particular output value for a particular sequence of past output values.

Figure 10:
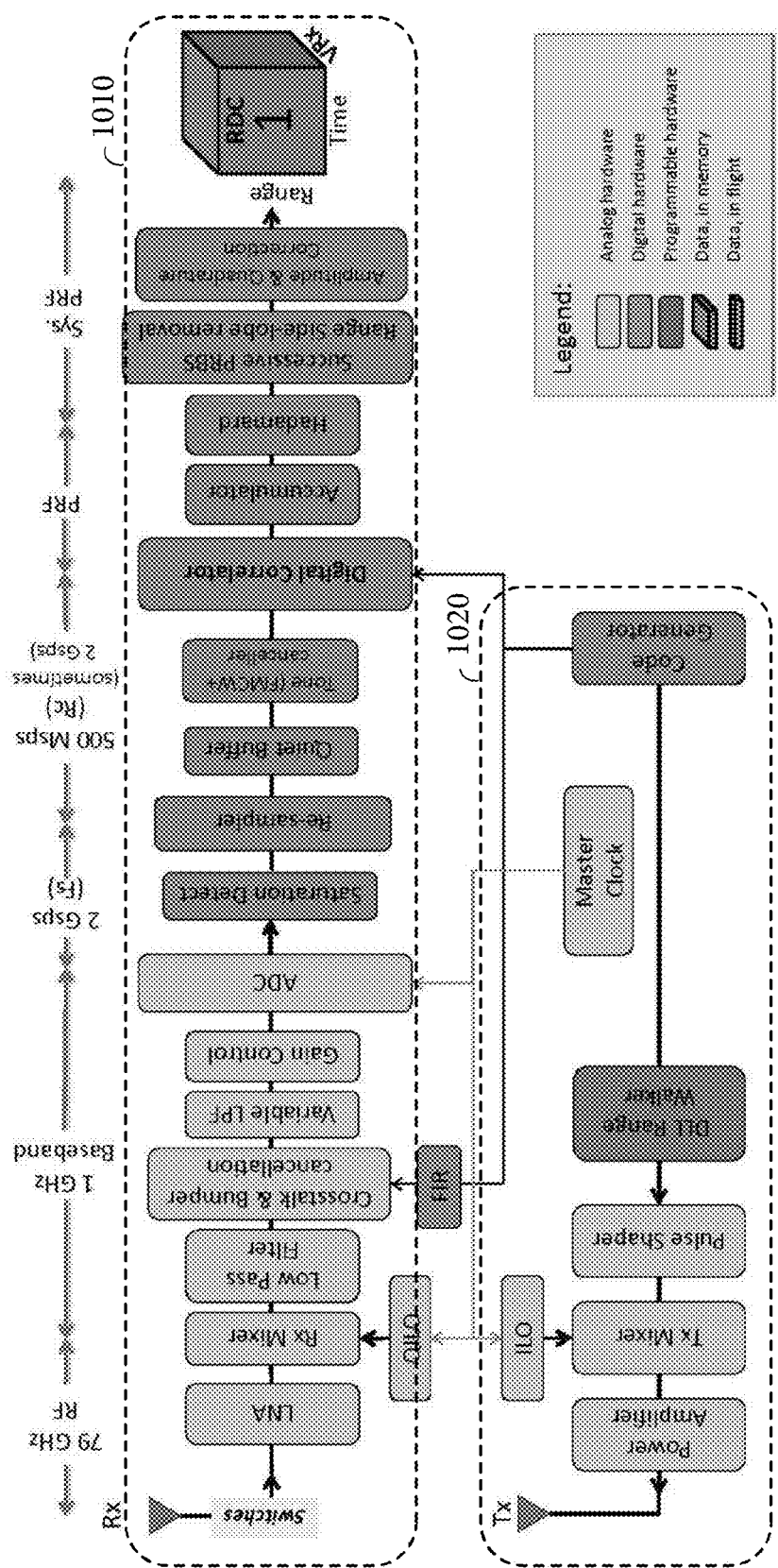
FIG. 10 is a block diagram of an exemplary receive pipeline and transmit pipeline for the radar system of the present invention.
Figure 11A:
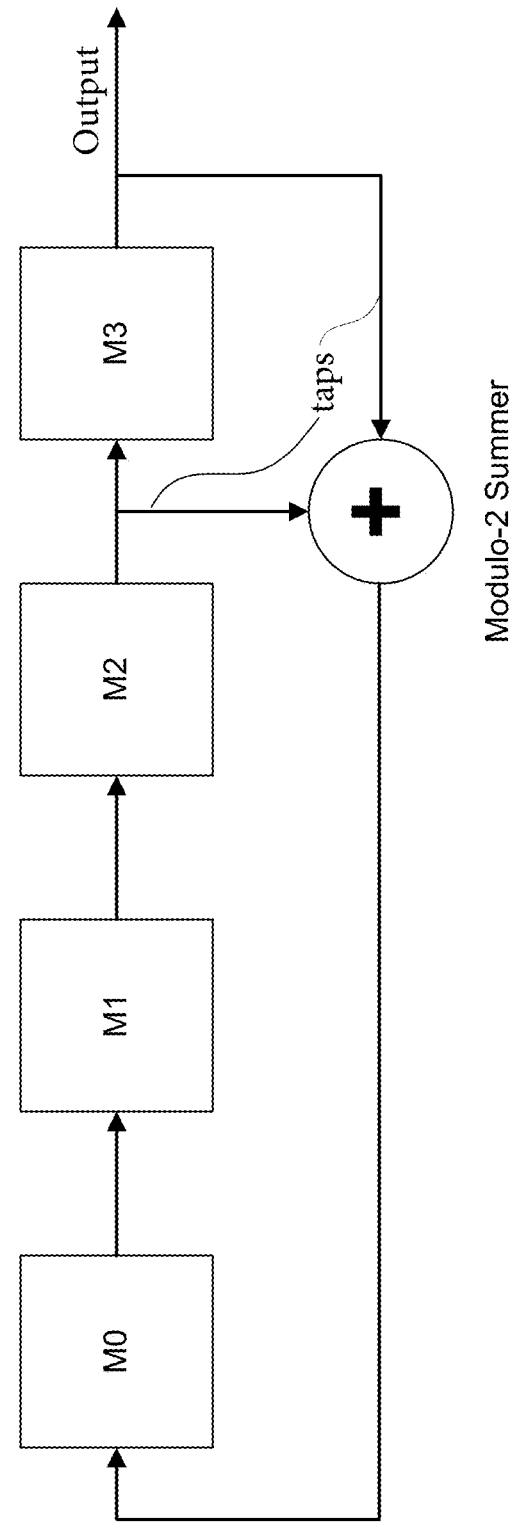
FIG. 11A is a diagram illustrating an m-sequence generator using a Fibonacci implementation in accordance with the present invention.

FIG. 11A illustrates a Fibonacci style m-sequence generator with a shift register and feedback. The Fibonacci style m-sequence generator of FIG. 11A may be used to generate a signal for use in a spread-spectrum (phase modulated) system. In this example, a shift register with four memory elements (M0-M3) stores a four-bit state that is shifted right at each clock cycle (an exemplary clock is illustrated in FIG. 10 for regulating the receive pipeline 1010 and transmit pipeline 1020). A modulo-2 sum of the last two stages (M2 & M3) is fed back to the left most memory element (M0) in the shift register. As illustrated in FIG. 11A, the modulo-2 summer sums the contents of the last two stages (M2 & M3) and outputs the sum to the left most memory element (M0). The output of the shift register is the sequence of bits from the right most memory element (M3). This m-sequence generator will generate a periodic sequence of length 15. Also known as an m-sequence.

A modulo-2 arithmetic operation provides binary (1 s & 0s) results. For example, if a result of an arithmetic operation is odd, the modulo-2 output is a 1. Similarly, the modulo-2 output will be 0 if the result of the arithmetic operation is even. A modulo-2 summing operation is the same as an exclusive OR operation also called an XOR operation, where an output is 1 only when there is an odd number of 1s in the input to the operation. The following Table I illustrates the results of a modulo-2 summing of the contents of memory elements M2 and M3, which is used as the input to memory element M0.

TABLE I

| M2 | M3 | Input to M0 |
|----|----|-------------|
| 0  | 0  | 0           |
| 0  | 1  | 1           |
| 1  | 0  | 1           |
| 1  | 1  | 0           |

As illustrated in FIG. 11A, a periodic sequence L with a period of 15 will be generated (where the period $L=2^M-1$). This periodic sequence looks somewhat random. The sequence may have roughly half 0s and half 1s (for example, 7 zeros and 8 ones). The period of the sequence L is the maximum that may be obtained from a shift register with m stages when $L=2^M-1$. For this reason, they are typically called m-sequences. Shift registers of any length may generate these m-sequences provided appropriate tap connections are used (taps may be located in a variety of locations and in a variety of combinations). These m-sequences are also call pseudo-noise (PN) sequences or pseudorandom binary sequences (PRBS). Because the sequence of bits generated is pseudorandom, the initial contents of the shift register is sometimes called the "seed." The contents of the shift register at any time may be referred to as "the state" of the shift register. The shift register which generates m-sequences may be used as a pseudorandom number generator (PRNG).

Figure 11B:
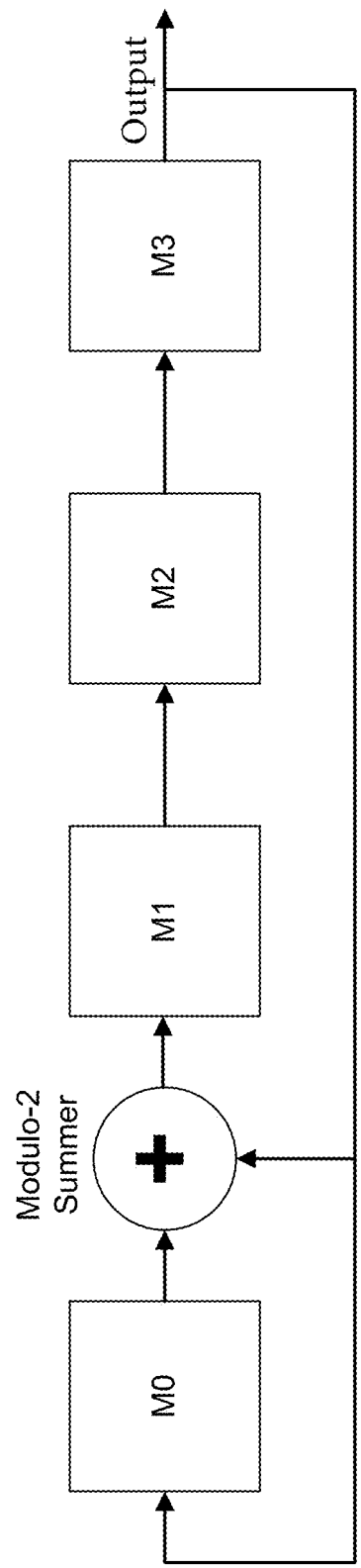
FIG. 11B is a diagram illustrating an m-sequence generator using a Galois implementation in accordance with the present invention.

Several ways to generate m-sequences are discussed herein. In the first method illustrated in FIG. 11A (the Fibonacci implementation) the contents of the left-most element is determined from a modulo-2 sum of a set of memory elements (M2, M3) before all memory elements (M0, M1, M2, & M3) shift right. In a second method illustrated in FIG. 11B, sometimes called a Galois implementation, the contents of several memory elements (M0, M1, M2, & M3) are combined with preceding memory elements. As illustrated in FIG. 11B, the contents of the right-most memory element (M3) is modulo-2 summed with the contents of the left-most memory element (M0). Note that the output of the right-most memory element (M3) is also passed to the left-most memory element (M0) when the memory elements are right-shifted. In further implementations, by performing an element-wide "AND" operation on the contents of each memory element and a mask sequence, a variety of m-sequences using different taps may also be generated. The mask could also be the output of a truly random number generator.

A similar approach to spoofing frequency modulated continuous wave radar systems may be used against phase modulated continuous wave radar systems by knowing what carrier waveform was used as a transmitted radar signal. For example, if a maximal length shift register sequence code (m-sequence) with 31 memory elements (stages) in the shift register (PRBS31) code is being used with fixed feedback taps (that is, the selection of memory elements does not shift or change), the current state of the PRBS may be found by looking at the 31 continuous bits of the code, and thus determine the waveform in the past and future. Additionally, even if both the seeds and the taps (locations and/or numbers) are changed, a system that uses, for example, approximately 64 bits as the address in a lookup table may determine what taps are being used and the current state. Currently, with a standard off-the-shelf personal computer (PC), this can be done at rates of tens of millions of operations per second, or in less than 100 nanoseconds (ns). This is a fraction of a round trip time (the time required for a radar system to transmit a radio signal, the transmitted radio signal to reflect off an object/target, and to be received by the radar system), so the state and the tap connection(s) can be found. Additionally, while more complex PRBS generators may be made from of a multitude of generators with different taps, seeds, and combining functions, there is still no assurance of true randomness required for secure waveforms. As long as the underlying hardware is known, a process can be generated to break any code that is not truly random. In addition, current radars that are being deployed today will be in production for at least 20 years. In that time frame, larger memories and faster machines or even new types of computers may be developed (possibly including quantum computers), which may allow for determining the underlying radar system hardware, taps, and seeds in the same order of magnitude as a single PRBS today. There are therefore likely no secure waveforms in this time-frame based on hardware implementations of algorithmically generated binary codes. Once a carrier waveform has been found, the direction of arrival (DOA) and range may be estimated. Similar techniques may then be used as described above to synthesize targets in front of the spoofer or to cloak the spoofer from the spoofee.

To prevent spoofers from placing targets in front of the spoofer (such that these false targets are placed between the spoofer and the spoofee), the binary code stream should be truly random. With this criterion, only spoofing attacks that are delayed replay attacks (also called follower jamming) that put the target behind the spoofer are possible. These attacks are less dangerous for an automobile system because they would put the spurious targets further out of range/time than a true target.

FMCW radar systems may be easy to spoof since their carrier waveforms are easily determined. With a PMCW radar system that is based on pseudo noise-like codes, pseudorandom numbers are used for determining the chip sequence of the phase modulation of the PMCW radar system. However, if truly random numbers were used in the phase modulation, spoofing the PMCW radar would become very difficult.

Pseudorandom number generators (PRNGs) are essentially algorithms that use mathematical formulae or precalculated tables to produce sequences of numbers that "appear" random. PRNGs are efficient, that is, they can produce many numerical values in a short time. Furthermore, PRNGs are deterministic, that is, a given sequence of numbers may be reproduced at a later date if the starting point in the sequence is known (because for a given sequence of output values of length equal to the number of stages in the shift register, a given output value can be known). Efficiency is an attractive characteristic if a particular application needs a serial stream with many values. Determinism may also be useful if a particular application needs to replay the same sequence of numbers again at a later stage or at a different place (for example, in a communication system). PRNGs are typically "periodic," which means that the sequence will eventually repeat itself.

While periodicity is not usually a desirable characteristic, modern PRNGs have a period which is so long that it may be ignored for most practical purposes. For example, PRBS 31 has a period of $(2^{31}-1)$, which is equal to 2,147,483,647, or in other words, more than two billion. These characteristics make PRNGs suitable for applications where many values are required and where it is useful that the same sequence of values may be replayed easily. Popular examples of such applications are simulation and modeling applications, as well as code-division multiple-access (CDMA) methods in a cellular environment. On the other hand, PRNGs are not entirely suitable for applications where it is important that the numbers are truly unpredictable.

True Random Number Generators (TRNGs)

In comparison with pseudorandom number generators, true random number generators may extract randomness from physical phenomena, such as radioactivity, thermal noise, or coin flipping. Coin flipping (by a human), where the coin landing tails up equals 0 and landing heads up equals 1, will generate truly random (unpredictable) bits (there are only two possible outcomes: heads or tails) but is very inefficient for generating a large number of binary values in a short time. TRNGs are therefore not as efficient as PRNGs since usually the rate of generation of the binary values is limited by a physical phenomenon. Table II, illustrated below, sums up the characteristics of the two types of random number generators.

TABLE II

Random Number Generator Characteristics

| Characteristic | Pseudo-Random Number Generators | True Random Number Generators |
|---|---|---|
| Efficiency | Excellent | Poor |
| Determinism | Deterministic | Nondeterministic |
| Periodicity | Periodic | Aperiodic |
| Uniformity | Easy to ensure | Often unknown |

So, while TRNGs are suitable for roughly the set of applications that PRNGs are unsuitable for, such as antispoofing, they have limitations including poor efficiency and an unknown distribution. In a radar case, for the performance of the radar system, it is important that the binary value distribution of the chips (phase modulations) should be equal with a probability of 50% or ½ (where each possible outcome (1 or 0) is statistically equally likely).

In accordance with an aspect of the present invention, exemplary methods provide for the generation of truly random bits from an analog-to-digital converter (ADC) at high rates (providing the desired efficiency) and at uniform frequency (irrespective of the actual binary value generation probability in the ADC). Uniformity of distribution for a binary random variable is the fact that the probability of each outcome is one half (½). Several methods to generate truly random numbers are described below.

One exemplary method to generate truly random numbers is to use the lower bits (least significant bits) of the output of the ADC to generate a truly random number. The LSB in the ADC is a random number owing to the presence of thermal noise in the receiver. Thermal noise, also called Johnson noise or white noise, is a voltage generated in an electrical system due to the thermal energy in electronics that is not at a temperature of 0 Kelvin. This noise has a power spectral density that is nearly flat, meaning it has the same power at all frequencies. This is true provided the frequencies are below optical (visible) frequencies (e.g., more than $4\times10^{14}$ Hz). In other words, two different frequency ranges of equal length will have the same power spectral density (e.g., 30-60 Hz and 350-380 Hz have the same power spectral density).

In accordance with an aspect of the present invention, a radar system's receive pipeline includes an analog-to-digital converter (ADC) which is sampled at 2 GHz. The least significant bit (LSB) will be influenced significantly by the thermal noise, such that the LSB may be a random number where a probability of the LSB being equal to 1 is close to ½ but not exactly ½. This is equivalent to physically flipping a biased coin whose probability of being heads is close to ½, but not necessarily exactly ½. In a sequence of binary trials (where there are only two possible results, such as with a coin toss), if the probability of success is 50%, then each trial may also be referred to as a "fair coin." But when the probability of success is less than 50%, each trial may then be referred to as a "biased coin" or "unfair coin."

In an embodiment of the present invention, following a John von Neumann (Neumann) algorithm, there is a way of duplicating the statistical probabilities of an unbiased coin from a biased coin. If for example, a physical coin appears to favor one side over another, the following procedure may be used:
1. Toss the coin twice.
2. If the results match, discard the results and start over.
3. If the results differ, use the first result and discard the second.
4. Repeat until the desired quantity of results has been reached.

Therefore, if there is a biased coin that comes up heads with a probability "p" and tails with a probability "q", where q=1−p, it is possible to use this biased coin to get a string of binary values which are uniformly distributed with probability ½. As noted above, flip the coin twice. If the result comes up heads first and tails second, call the result a 0. If the result comes up tails first and heads second, then call the result a 1. The opposite may also be used: if the result comes up heads first and tails second, call the result a 1, and if the result comes up tails first and heads second, call the result a 0. If the result values of the two flips are the same (heads, head) or (tails, tails), the results are discarded and the coin is flipped again. The process may be repeated until there is a toss with non-matching outcomes. If a round is defined as a pair of coin flips, it is clear that the probability of generating a result of 0 or a 1 (a success) is the same each round. In other words, a simulated unbiased coin. This solution works regardless of the probability p that the coin lands heads up, even if this probability is unknown.

To determine how efficient binary value generation is, there is a general formula following a recursive approach. For each round the probability of generating a random bit (success) in that round is s (where s=2pq). Meanwhile, the expected number of total flips t required to get a success is denoted by t. The expected number of flips t to get a success satisfies a simple recursion. If there is success in the first round, the number of rounds to generate a binary value (bit) is 1. If not, the expected additional number of rounds is t. Therefore, t=2pq(1)+(1−2pq)(t+1), which can be solved to obtain that t is equal to 1/(2pq), which is also equal to 1/(2p(1−p)). Therefore, the expected number of rounds t to get a random bit when p is close to ½ is about 2. Since each round is 2 coin tosses, the expected (average) number of coin tosses necessary to generate a single random bit is 4. This process produces a fair result because the probability of getting heads and then tails from a coin toss must be the same as the probability of getting tails and then heads. The coin must not be capable of changing its bias between flips and the two flips must be independent of each other. Further, the Neumann procedure only works when a result does not change the coin's bias on subsequent coin tosses. Obviously, there is a limit to how much bias can be dealt with. One side of the coin cannot have a probability of zero. And as discussed herein, a sequence of four tosses may also be considered (for example, if a first pair match, but the second pair match with the opposite side, the first result may be used). The sequences (H, H, T, T) and (T, T, H, H) are equally likely.

Figure 12:
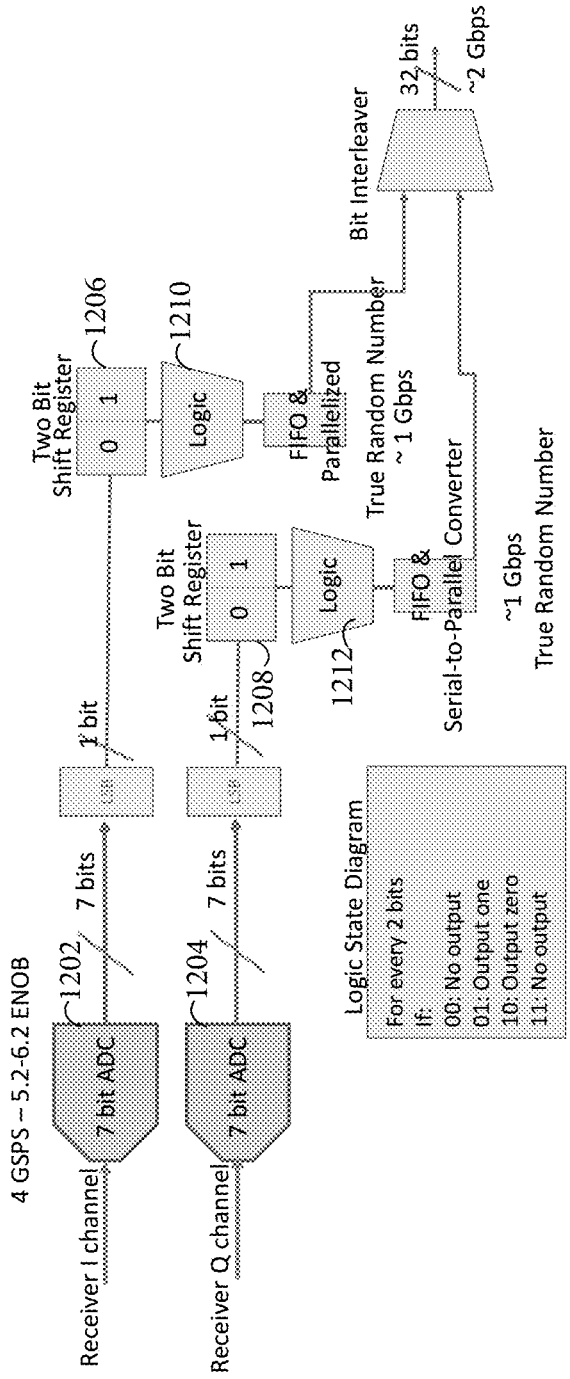
FIG. 12 is a diagram illustrating an exemplary random number generator that processes signals by an analog to digital (ADC) and a truly random number generator in accordance with the present invention.

FIG. 12 illustrates how this process may be used to generate a truly random code of binary values by using the following mapping of the binary values (bits) to generate a random bit value. FIG. 12 illustrates a pair of 7-bit ADCs 1202, 1204, one for an in-phase (I) channel (ADC 1202) and the other for a quadrature (Q) channel (ADC 1204) of the receive pipeline 1010 of a radar system (see FIG. 10). The ADCs 1202, 1204 are sampled at a certain rate and least significant bit values are put into respective two-stage shift registers 1206, 1208. Consider two consecutive LSBs from each of the ADCs 1202, 1204. If a two-bit sequence of binary values in either of the two-stage shift registers 1202, 1204 is 0,0 or 1,1 (as determined by the logic 1210, 1212), the binary results are discarded and another two consecutive binary values are generated. As discussed herein, the logic 1210, 1212 may include an exclusive OR (XOR) to evaluate the binary values. If the two bit sequence in a two-bit shift register 1206, 1208 is 0,1 (as illustrated in FIG. 12), an output from the two-bit shift register 1206, 1208 will be mapped to an FIFO buffer following a shift of the two-bit shift register 1206, 1208. A shift in the two-bit shift register 1206, 1208 holding a two bit sequence of 0,1, will output a binary value 1 to the associated FIFO buffer. In other words, the result is a truly random bit value of 1 (that is, "digital heads"). If the two bit sequence is 1, 0, when the two-bit shift register 1206, 1208 shifts, a truly random bit value of 0 (that is a "digital tails") will be mapped to the associated FIFO buffer.

Ideally, such a random code generating system may generate a random bit value for every four ADC samples. Since the present embodiment has two ADCs per receiver (one for the I channel and one for the Q channel), and may be sampled at 2 GHz, there would be 2*2=4 Gbps (gigabits per second) per receive channel. These 4 Gbps of LSB bits from the I and Q channels of the receivers can result in 1 Gbps of truly random numbers which can be then used as a TRGN for the transmitted signal if mapped using two bits at a time. For an 8-receiver system, 2 Gbps of truly unbiased random bits may be generated which may be used as the truly random binary valued codes used to phase modulate a carrier to generate the transmitted signal.

Figure 13:
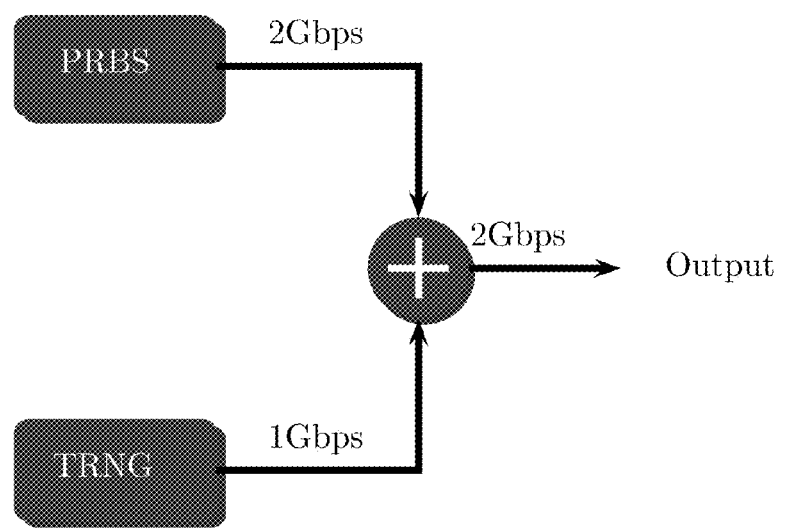
FIG. 13 is a diagram illustrating the XORing of a pseudorandom bit sequence (PRBS) with random numbers from a truly random number generator (TRNG) to create a randomized serial stream of binary values in accordance with the present invention.

If it is necessary to transmit with phase modulation by binary codes at a rate greater than the rate at which truly random numbers could be generated then a deterministic PRNG (m-sequence generator) which is generating a PRBS at a higher rate may be used in addition to the lower rate truly random number generator (TRNG) (see FIG. 13). This may be done in several ways. For example, the truly random numbers may be generated and simply XORed with the PRBS. If the PRBS is generating random bits at a rate of 2 Gbps and the truly random number generator is generating bits at 1 Gbps then every two bits of the PRBS would be XORed with one bit from the TRNG. This is illustrated in FIG. 13. Note that the rate of the PRBS can be any multiple of the rate of the TRNG. Different PRBS's can be used to generate different sequences for different transmitters, using the same TRNG.

Figure 14:
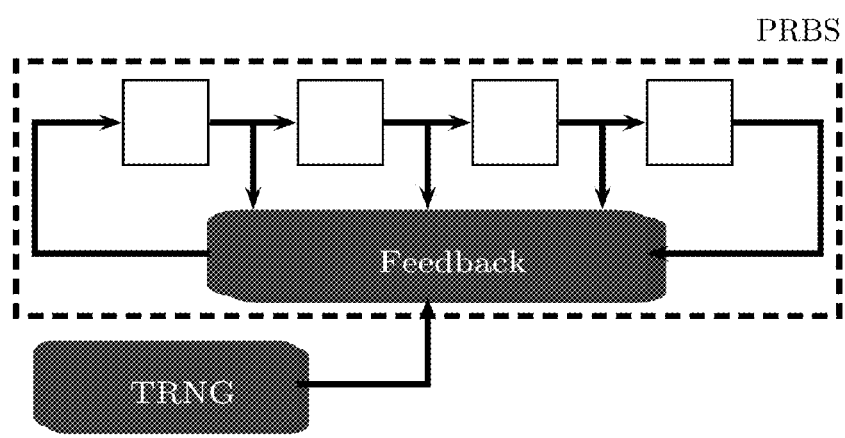
FIG. 14 is a diagram illustrating TRNG output values combined with PRBS feedback values in accordance with the present invention.

Another method of generating a higher rate random bit stream is to use the TRNG to modify in some way the feedback connections of the PRBS as illustrated in FIG. 14. As an example, using the last 10 bits of the TRNG can be used to select from 1024 different possible feedback connections of a PRBS of length 31, for which there are many more than 1024 different sequences. This would be changed at the rate at which the TRNG is generating bits. For example, the TRNG could be generating bits at a rate of R bps and the PRBS could generate at a rate 31 times larger. In this case, the PRBS would produce 31 bits and then the feedback connection would change in a random way. A spoofer would not have enough information after observing less than 31 bits to be able to predict the future bits. Once 31 bits were observed, which might have been sufficient to determine the feedback connections, the feedback connections would change.

Figure 15:
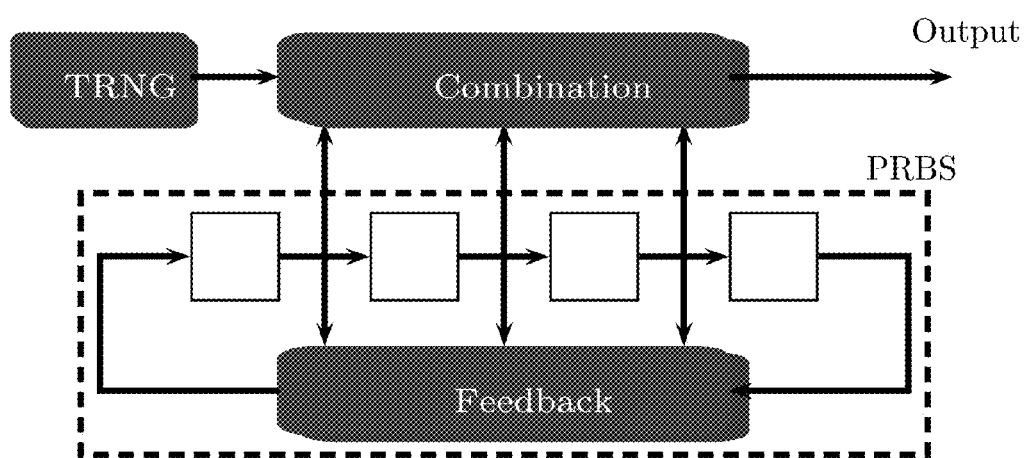
FIG. 15 is a diagram illustrating a PRBS with memory cell outputs combining with TRNG output values to generate an output in accordance with the present invention.

Another way to use a PRBS with a TRNG generates a higher rate sequence, as illustrated in FIG. 15. As illustrated in FIG. 15, the contents of the memory are linearly combined using XOR gates. Depending on which memory elements are combined yields a different shift of the m-sequence. Using the TRNG, which particular combination is employed may be modified. The combination being combined may be changed depending on the TRNG at a rate much less than the rate of the PRBS. If the PRBS has m stages of memory elements and generates data a rate of RP and the TRNG has a rate of RP/m, then every m PRBS outputs, the sequence would change to a different shift of the same sequence. The resulting sequence would be difficult to spoof.

Yet another way of using a TRNG in combination with a PRBS is to insert between the bits of the PRBS, bits from the TRNG. If the location of where the TRNG bits are inserted is also random, then a new sequence that is more difficult to spoof would be generated. For example, three consecutive bits of a TRNG could determine (via a look-up date, for example) where to insert a TRNG output bit. So in this example, four bits are used to insert a random bit at a random location.

Figure 16:
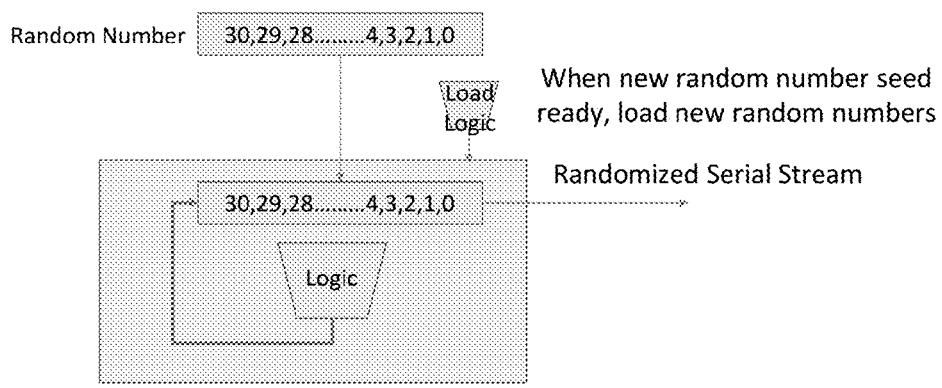
FIG. 16 is a diagram illustrating the reseeding of an exemplary pseudorandom number generator with random numbers in accordance with the present invention.

In these embodiments, while it may be true that not all of the bit values of the code sequence (the randomized serial stream) are truly random, a significant fraction, e.g., ½ of bits are, and the truly random bits are interspersed pseudo-randomly in the resulting binary code along with bits which were output as part of the deterministic PRBS. Such an exemplary system would not be vulnerable to attack where the binary code could be predicted by looking at a finite length of the code and using a lookup table for all possible combinations of taps and seeds (because half of the bit values of the randomized serial stream were truly random). As illustrated in FIG. 16, the output value bits of the truly random number generator may also be used as the seed for a PRBS generator. As illustrated in FIG. 16, the PRBS tap locations may also be dynamically determined according to the current random number value. The output would be a pseudorandom number that is randomly adjusted according to the output of a truly random number generator. Such an embodiment would provide for a more difficult PRBS to predict.

To get a higher rate of truly random binary bit values, the process could be generalized as follows. Consider a sequence of four digital coin flips. If the first pair of flips are (H, T) or (T, H), or the first pair of flips are the same (T, T) or (H, H), but the second pair were (H, T) or (T, H), then von Neumann's method, as described herein, may be used. The process may be improved by pairing up the matching sequences (H, H) and (T, T); and (T, T) and (H, H). If the first sequence appears, it is considered to be a 0, and if the second sequence appears, it is considered to be a 1. That is, if both pairs of flips are the same, but the pairs are different, then Neumann's method may be used, except that the order of the pairs of coin flips is considered.

Considering this idea further, and as illustrated in FIG. 17, each simulated flip of the actual coin may be a "level 0" flip. If level 0 flips 2j−1 and 2j are different (H, T) or (T, H), then the order of the results may be used (heads-tails or tails-heads) to obtain a bit value (b). In other words, this is Neumann's process again. If the two level 0 flips are the same, however, then these two flips are considered a level 1 flip. If level 1 flips 2j−1 and 2j are different, again this provides a bit value (b). But if not, the two flips may be considered a level 2 flip, and so on. This may be considered a multi-level strategy.

The multi-level strategy illustrated in FIG. 17 does not take advantage of additional sequences that could be considered a valid bit value. For example, in the multi-level strategy, the sequences H & H & H & T and H & T & H & H may also be considered a valid binary value. Because these two sequences occur with the same probability, these two sequences may be paired up to provide a bit value. For example, if the first sequence comes up, the first sequence may be considered a 0, and if the second sequence comes up, the second sequence may be considered a 1.

To extract this extra randomness, the multi-level strategy may be expanded to an advanced multi-level strategy illustrated in FIG. 18. Recall that in the multi-level strategy of FIG. 17, level 0 flips are used to generate a sequence of level 1 flips. In the advanced multi-level strategy, two sequences may be determined from level 0. The first sequence extracted will be level 1 from the multi-level strategy. For the second sequence, which is called level A, flip j records whether flips 2j−1 and 2j are the same or different in level 0. If the flips are different, then the flip in level A will be tails, and otherwise it will be heads (see FIG. 18). Of course, the process may be repeated, so from each of level 1 and level A, there may be two new sequences, and so on. To extract a sequence of bit values, the sequences may be gone through in a fixed order. Furthermore, von Neumann's method may also be used.

It can be illustrated that the rate of generating truly random bits using this process is 4 Gbps/H(p), where H(.)=−p log 2(p)−(1−p)log 2(1−p) is the binary entropy function. When p is close to ½, H(p) is about 1.

Another method of producing random bits with an equal probability of a result being 0 or 1 is to compress the sequence LSB's at the output of an ADC using a universal compression algorithm such as the Lempel-Ziv compression.

Other physical methods for generating truly random bits at high rates may be used, such as: using meta stability of flip-flops, using ADCs connected to resistors, and using the random generation of bit values. These truly random binary codes will prevent spoofing in front of the spoofer or cloaking the spoofer, making it not a viable attack for automotive based radars. These truly random binary codes may be used internally to correlate the received signals to enable the full functionality of the radar system similar to PRBS-generated binary codes.

Therefore, the PMCW radar system provides fully digital modulation, with features becoming all digital vs analog. The RF is simpler and smaller, with about a 10× advantage in size over FMCW systems. The radar system provides more area for digital processing, and provides improved range resolution, enhanced range isolation—very small targets next to large targets, enhanced interference mitigation architecture (it can handle an order of magnitude more interferers than FMCW), and enhanced isolation from interfering radars. The radar system provides true MIMO processing, which enables unmatched angular and super resolution. The PMCW radar system is also naturally resistant to jamming. The above described PMCW radar system when comprising multiple transmitters and multiple receivers in a multiple-input-multiple-output (MIMO) system is useful in a radar system where the receivers and transmitters need to receive and transmit simultaneously.

In an aspect of the present invention, exemplary embodiments may utilize 28 nm bulk CMOS 79 GHz automotive radar, which supports up to 192 Virtual Receivers (or more). The system of the present invention provides super-resolution and can provide the tracking of up to around 2,500 objects. The system has access to static slices and processing for drivable surfaces. The system provides a complete Radar-on-a-Chip (ROC) and provides support for multiple chips. The system provides Long Baseline Interferometry (LBI), and has a substantially larger aperture (better angular accuracy) and a better estimate of centroid. With the present invention, it is possible to have just a 4-6 LBI multi-mode radar system for cocooning coverage (LRR, MRR, SRR, USRR).

The system of the present invention provides enhanced accuracy and may provide the highest accuracy and resolution over all standalone radars. The large MIMO array and LBI capability provides higher angular accuracy and resolution, such as for detection of vulnerable road users (VRU)—detecting pedestrians and cyclists at greater range enables earlier warning, while longer range detection at high azimuth angles enables a longer tracking period for a lower probability of false alarms. The high sampling frequency and range walking of the system of the present invention provides enhanced range resolution and accuracy, such as for parking assistance, BLIS, LCA—all the way down to mm range in resolution and accuracy. For detection of VRU, the system provides high range resolution for selected targets at large distances. The hardware Doppler processing engine of the system of the present invention provides enhanced or unmatched radial velocity resolution. For detection of VRU, the system provides micro-Doppler detection and classification of pedestrians (moving arms/legs) and bicycles (moving legs, wheels).

The software defined radar system of the present invention thus provides full digital control of scan parameters, which allows the radar to adapt to changing scenarios. The system maintains the highest resolution/accuracy tracking for high priority targets while continuously scanning for new detections. For long range detection and tracking (4 high-power transmitters per connected radar), such as for forward collision warning (FCW) or autonomous emergency braking (AEB), the maximum range is limited only by RCS—car detection at over 500 m—which enables longer tracking time. The system provides enhanced signal processing power, and is integrated into a single chip, and provides super-resolution angle-of-arrival processing for separating objects and micro-Doppler tracking, such as for VRU—cyclists and pedestrians. The system of the present invention also provides low level fusion, and can operate in a high target density urban environment—with a simultaneous tracking of 2500 objects. The system has access to a complete digital pipeline that can be used to refine the region of interest (ROI) being scanned/processed. As discussed herein, exemplary embodiments provide for highly efficient, truly random binary values for the random generation of the binary codes used in the generation of phase modulated waveforms. As also discussed herein, the binary output values from truly random number generators may be XORed with the binary output values from pseudorandom number generators to increase the chip rate (increased efficiency) of the radar system. As also discussed herein, multi-level evaluation of the binary values may be used to increase the binary stream bit rate.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A radar sensing system for a vehicle, the radar sensing system comprising:
   a transmit pipeline comprising a transmitter configured for installation and use on a vehicle and operable to transmit radio signals;
   a receive pipeline comprising a receiver configured for installation and use on the vehicle and further configured to receive a radio signal, wherein the received radio signal includes a reflected radio signal that is the transmitted radio signal reflected from an object;
   wherein the transmit pipeline is further configured to phase modulate the radio signals before transmission, and wherein the phase modulation is defined by a first binary sequence; and
   wherein the transmit pipeline is further configured to define the first binary sequence at least in part by a truly random, unbiased sequence of bits with an equal statistical probability of 1 and 0.

2. The radar sensing system of claim 1 further comprising an analog to digital converter (ADC) configured to generate bits based on an input signal, and wherein the truly random, unbiased sequence of bits is defined by a sequence of least significant bit (LSB) outputs derived from the bits generated by the ADC.

3. The radar sensing system of claim 2 further comprising a pseudorandom binary sequence (PRBS) generator operable to output a second binary sequence of bits, wherein the transmit pipeline is further operable to further define the first binary sequence at least in part by the second binary sequence of bits output from the PRBS generator.

4. The radar sensing system of claim 3, wherein the transmit pipeline comprises a phase modulator operable to phase modulate a continuous wave radio signal.

5. The radar sensing system of claim 4, wherein the phase modulator receives LSB outputs from the ADC.

6. The radar sensing system of claim 4, wherein the phase modulator receives the second binary sequence of bits output from the PRBS generator.

7. The radar sensing system of claim 4, wherein the LSB outputs from the ADC and the second binary sequence of bits output from the PRBS generator are XORed and an output of the XORing is provided to the phase modulator.

8. The radar sensing system of claim 3, wherein the PRBS generator comprises one of a Fibonacci-style m-sequence generator and a Galois-style m-sequence generator, and wherein a plurality of seeds for the PRBS generator is defined by the LSB outputs from the ADC, and wherein a quantity of feedback taps and corresponding locations for the feedback taps are defined by the LSB outputs from the ADC.

9. The radar sensing system of claim 4, wherein the LSB output values from the ADC and the second binary sequence bit output values from the PRBS generator are compared and random bit values, as defined by the sequence of LSB output values and the sequence of second binary sequence bit values, are output to the phase modulator.

10. The radar sensing system of claim 2, wherein the receive pipeline further comprises an in-phase (I) channel with a first ADC, and a quadrature (Q) channel with a second ADC.

11. The radar sensing system of claim 10, wherein LSB outputs from the first ADC and the second ADC are compared and resulting binary comparison values are used to further define the first binary sequence.

12. A radar sensing system for a vehicle, the radar sensing system comprising:
   a transmit pipeline comprising a transmitter configured for installation and use on a vehicle and further configured to transmit radio signals;
   a receive pipeline comprising a receiver configured for installation and use on the vehicle and further configured to receive a radio signal, wherein the received radio signal includes a reflected radio signal that is the transmitted radio signal reflected from an object;
   wherein the transmit pipeline is further configured to phase modulate the radio signals before transmission, and wherein the phase modulation is defined by a first binary sequence;
   wherein the receive pipeline comprises an analog to digital converter (ADC) operable to sample the received radio signal and generate bits based on the sampled radio signal;
   wherein the transmit pipeline further comprises a pseudorandom binary sequence (PRBS) generator configured to output the first binary sequence, and wherein the output of the PRBS generator is defined at least in part by a second binary sequence;
   wherein the transmit pipeline is further configured to define the second binary sequence at least in part by a sequence of least significant bit (LSB) outputs derived from the bits generated by the ADC; and
   wherein the first binary sequence comprises a random sequence of bits with an equal statistical probability of 1 and 0.

13. The radar sensing system of claim 12, wherein at least one of a plurality of seeds to the PRBS generator and a plurality of feedback tap locations of the PRBS generator are defined at least in part by the second binary sequence, and wherein a quantity of feedback taps is also defined by the second binary sequence.

14. The radar sensing system of claim 13, wherein the output of the first binary sequence is unpredictable and statistically independent from one output to the next output.

15. The radar sensing system of claim 12, wherein the receive pipeline further comprises an in-phase (I) channel with a first ADC, and a quadrature (Q) channel with a second ADC.

16. The radar sensing system of claim 15, wherein LSB outputs from the first ADC and the second ADC are compared and resulting binary comparison values used to further define the second binary sequence.

17. A method for generating random binary values for a vehicle radar sensing system, said method comprising:
    providing a radar sensing system comprising a transmit pipeline comprising a transmitter configured for installation and use on a vehicle, and operable to transmit a radio signal, and a receive pipeline comprising a receiver configured for installation and use on the vehicle, and operable to receive a radio signal, wherein the received radio signal includes a reflected radio signal that is the transmitted radio signal reflected from an object;
    phase modulating the radio signal before transmission, as defined by a first binary sequence;
    performing sampling of a signal in the receive pipeline, wherein the sampling is performed by an analog to digital converter (ADC), and wherein the sampling produces least significant bit (LSB) outputs from the ADC;
    outputting a second binary sequence of bits, wherein the second binary sequence of bits comprises a pseudorandom binary sequence (PRBS); and
    defining the first binary sequence at least in part by at least one of (a) the least significant bit (LSB) outputs from the ADC and (b) the second binary sequence of bits, wherein the first binary sequence comprises a truly random unbiased sequence of bits with an equal statistical probability of 1 and 0.

18. The method of claim 17, wherein the PRBS is provided by a PRBS generator, and wherein the method further comprises defining seed inputs to the PRBS generator with the LSB outputs from the ADC.

19. The method of claim 17, wherein the output of the first binary sequence is unpredictable and statistically independent from one output to the next output.

20. The method of claim 17, wherein the receive pipeline further comprises an in-phase (I) channel with a first ADC, and a quadrature (Q) channel with a second ADC.

21. The method of claim 20 further comprising comparing LSB outputs from the first ADC and the second ADC, and further defining the second binary sequence with resulting binary comparison values.

22. A radar sensing system for a vehicle, the radar sensing system comprising:
    a transmitter configured for installation and use on a vehicle and further configured to transmit radio signals;
    a receiver configured for installation and use on the vehicle and further configured to receive a radio signal, wherein the received radio signal includes a reflected radio signal that is the transmitted radio signal reflected from an object;
    wherein the transmitter is further configured to phase modulate the radio signal before transmission, and wherein the phase modulation is defined by a first binary sequence;
    wherein the transmit pipeline further comprises a pseudorandom binary sequence (PRBS) generator configured to output the first binary sequence, and wherein the output of the PRBS generator is defined at least in part by a second binary sequence;
    wherein the transmitter is further configured to define the second binary sequence at least in part by a truly random, unbiased sequence of bits with an equal statistical probability of 1 and 0; and
    wherein the first binary sequence comprises a random sequence of bits with an equal statistical probability of 1 and 0.

23. The radar sensing system of claim 22 further comprising an analog to digital converter (ADC) configured to generate bits based on an input signal, and wherein the truly random, unbiased sequence of bits is defined by a sequence of least significant bit (LSB) outputs derived from the bits generated by the ADC.

24. The radar sensing system of claim 22, wherein the ADC is part of a processing circuit of the receiver.

25. The radar sensing system of claim 22, wherein at least one of a plurality of seeds to the PRBS generator and a plurality of feedback tap locations of the PRBS generator are defined at least in part by the second binary sequence, and wherein a quantity of feedback taps is also defined by the second binary sequence.

26. The radar sensing system of claim 25, wherein the processing circuit of the receiver further comprises an in-phase (I) channel with a first ADC, and a quadrature (Q) channel with a second ADC, and wherein the processing circuit is configured to compare LSB outputs from the first ADC and the second ADC and the resulting binary comparison values used to further define the second binary sequence.

* * * * *